(12) United States Patent
Zhou et al.

(10) Patent No.: US 12,244,751 B2
(45) Date of Patent: Mar. 4, 2025

(54) ELECTRONIC DEVICE

(71) Applicant: Honor Device Co., Ltd., Shenzhen (CN)

(72) Inventors: Yawei Zhou, Shenzhen (CN); Lianjie Ye, Shenzhen (CN); Yukun Guo, Shenzhen (CN); Zhifei Tian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/790,338

(22) PCT Filed: Mar. 1, 2022

(86) PCT No.: PCT/CN2022/078629
§ 371 (c)(1),
(2) Date: Jun. 30, 2022

(87) PCT Pub. No.: WO2022/184057
PCT Pub. Date: Sep. 9, 2022

(65) Prior Publication Data
US 2024/0195902 A1 Jun. 13, 2024

(30) Foreign Application Priority Data

Mar. 3, 2021 (CN) .......................... 202110237840.X
May 29, 2021 (CN) ............................ 202110595681.0

(51) Int. Cl.
*H04M 1/23* (2006.01)
*H04M 1/02* (2006.01)

(52) U.S. Cl.
CPC ......... *H04M 1/233* (2013.01); *H04M 1/0281* (2013.01); *H04M 1/0283* (2013.01)

(58) Field of Classification Search
CPC ... H04M 1/233; H04M 1/0281; H04M 1/0283
See application file for complete search history.

(56) References Cited

U.S. PATENT DOCUMENTS 8,858,101 B2 * 10/2014 Idera .................... G03B 17/565
396/531
11,787,050 B1 * 10/2023 Kaehler ................ B25J 19/021
700/253

(Continued)

FOREIGN PATENT DOCUMENTS

| CN | 201285488 Y | 8/2009 |
| CN | 201311537 Y | 9/2009 |

(Continued)

*Primary Examiner* — Justin Y Lee
(74) *Attorney, Agent, or Firm* — Conley Rose, P.C.

(57) ABSTRACT

An electronic device includes a rear cover and a camera decoration component. The camera decoration component includes a decoration member, a dial plate, a plurality of positioning members, and a plurality of induction members. The dial plate is annular, and is sleeved on an outer peripheral side of the decoration member. The decoration member includes a virtual rotation axis, and the dial plate is rotatably connected to the decoration member. The decoration member is configured to rotate around the virtual rotation axis of the decoration member. The positioning members and the induction members are configured to control the dial plate to be in a hovering state.

20 Claims, 15 Drawing Sheets

(56) References Cited

U.S. PATENT DOCUMENTS

| | | | | |
|---|---|---|---|---|
| 2004/0170270 | A1* | 9/2004 | Takashima | H04M 1/72469 379/363 |
| 2016/0252888 | A1* | 9/2016 | Kim | G04G 21/00 368/278 |
| 2017/0003149 | A1* | 1/2017 | Berk | G01D 11/24 |
| 2019/0179265 | A1* | 6/2019 | Ozawa | G04B 19/283 |
| 2019/0212830 | A1 | 7/2019 | Xu et al. | |
| 2019/0294113 | A1* | 9/2019 | Silvant | G04B 19/283 |

FOREIGN PATENT DOCUMENTS

| | | |
|---|---|---|
| CN | 201421795 Y | 3/2010 |
| CN | 102998879 A | 3/2013 |
| CN | 202841274 U | 3/2013 |
| CN | 108174070 A | 6/2018 |
| CN | 111327832 A | 6/2020 |
| CN | 212572639 U | 2/2021 |
| JP | 2008078045 A | 4/2008 |
| KR | 20070078443 A | 8/2007 |

* cited by examiner

ELECTRONIC DEVICE

CROSS-REFERENCE TO RELATED APPLICATIONS

This application is a U.S. National Stage of International Application No. PCT/CN2022/078629 filed on Mar. 1, 2022, which claims priority to Chinese Patent Application No. 202110237840.X, filed with the China National Intellectual Property Administration on Mar. 3, 2021, and Chinese Patent Application No. 202110595681.0, filed with the China National Intellectual Property Administration on May 29, 2021, all of which are incorporated herein by reference in their entireties.

TECHNICAL FIELD

This application relates to the technical field of electronic devices.

BACKGROUND

As electronic devices such as mobile phones are developing toward a larger screen size, it becomes increasingly difficult for a user to operate such an electronic device with one hand. As a result, a user often needs to perform corresponding operations with two hands, which is rather inconvenient.

SUMMARY

The present invention provides an edge protection structure and a folding display terminal including the edge protection structure. The edge protection structure can protect an edge of a part of a display screen corresponding to a position of a fixed axis, improve the appearance effect of the folding display terminal without affecting the folding effect of the folding display terminal, and prevent the display screen from being damaged due to problems such as collision during use, thereby improving the reliability of the folding display terminal including the edge protection structure.

According to a first aspect, this application provides an edge protection structure. The edge protection structure is configured to protect an edge of a bent region of a display screen. The edge protection structure includes a hard member, a connection member, and a soft rubber member. The strength of the hard member is greater than that of the soft rubber member. An objective of this application is to provide an electronic device to resolve the existing problem of relatively inconvenient operation of an electronic device such as a mobile phone.

To resolve the foregoing technical problem, this application provides an electronic device. The electronic device includes a rear cover and a camera decoration component that are fixedly connected. The camera decoration component includes a decoration member, a dial plate, a plurality of positioning members and a plurality of induction members; the dial plate is annular, and is sleeved on an outer peripheral side of the decoration member; and the decoration member includes a virtual rotation axis, and the dial plate is rotatably connected to the decoration member, and is configured to rotate around the virtual rotation axis of the decoration member. The plurality of positioning members are fixed to the decoration member and are disposed toward the dial plate, the plurality of positioning members are disposed at equal intervals along a circumferential direction of the virtual rotation axis, the plurality of induction members are fixed to the dial plate and are disposed toward the decoration member, and the plurality of induction members are disposed at equal intervals along the circumferential direction of the virtual rotation axis. The virtual rotation axis is used as a center of a circle, an angle between two adjacent positioning members is α, an angle between two adjacent induction members is β, and there is an integer multiple relationship between the angle α and the angle β; and during directly facing each other, the positioning member and the induction member are configured to control the dial plate to be in a hovering state. Through the cooperation between the dial plate and the decoration member, the electronic device includes a dial plate that is relatively rotatable, to make it convenient for a user to dial. Based on this, by dialing the dial plate, an interaction function of the electronic device may be expanded to enrich the user experience in different use scenarios. For example, by dialing the dial plate, functions such as swiping a display page or flipping a display page may be implemented to expand man-machine interaction manners and help the user obtain related information of the display page conveniently and quickly.

In some embodiments, the electronic device further includes a sensor, and the sensor directly faces the dial plate, and is configured to obtain motion information of the dial plate during rotation. It should be understood that, through the cooperation between the dial plate and the related sensor, motion information such as a rotation direction and a rotation angle during dialing of the dial plate may be obtained, thereby triggering related functions of software to facilitate the expansion of man-machine interaction functions.

In some embodiments, the decoration member includes a main body portion and an annular bearing portion, and the bearing portion is located on an outer side of the main body portion and is disposed around the main body portion; and the plurality of positioning members are disposed at equal intervals along a circumferential direction of the bearing portion. A material of the decoration member may be aluminum alloy or the like, and a material of the dial plate may be, for example, aluminum alloy or stainless steel.

In some embodiments, the bearing portion includes a plurality of first mounting grooves disposed at equal intervals, and each of the positioning members is correspondingly mounted in each of the first mounting grooves; and the dial plate is disposed on the bearing portion and is rotatably connected to the main body portion, the dial plate includes a plurality of second mounting grooves disposed at equal intervals, and each of the induction members is correspondingly mounted in each of the second mounting grooves. Based on the first mounting groove and the second mounting groove, thicknesses of the dial plate, the camera decoration component, and the like may be better controlled while the induction member and the positioning member are correspondingly mounted. When the camera decoration component is applied to an electronic device, while expanding the interaction functions, space occupied by the interior of the electronic device may be reduced and a thickness of the camera decoration component protruding from the rear cover may be controlled, so that an overall thickness of the electronic device may be easily controlled.

In some embodiments, the main body portion is provided with a boss in an axial direction along the virtual rotation axis, and the boss protrudes relative to the dial plate. It should be understood that the boss may protrude relative to the dial plate to protect the dial plate to a certain extent and reduce the possibility that the dial plate is bumped and deformed by a force.

In some embodiments, the positioning member is made of magnetic metal, the induction member is made of magnetic iron, and the sensors are Hall sensors. When the dial plate is in the hovering state, the Hall sensor directly faces the induction member, and the Hall sensor is configured to obtain magnetic field change information of the induction member that moves synchronously during movement of the dial plate. It should be understood that when the dial plate rotates, the Hall sensor senses a change of a magnetic field, and information such as the rotation direction and the rotation angle of the dial plate may be obtained to trigger the corresponding function of software.

In some embodiments, a relationship between the angle $\alpha$ and the angle $\beta$ is $\alpha=\beta*N$, where N is a positive integer greater than or equal to 3. The quantity of the Hall sensors is N, and the plurality of positioning members and the N Hall sensors are circumferentially disposed around the bearing portion as a whole. The virtual rotation axis is used as the center of the circle, both an angle between two adjacent Hall sensors and an angle between a Hall sensor and an adjacent positioning member are $\lambda$, and $\lambda=\beta$.

In some embodiments, the dial plate includes a top surface and a bottom surface opposite to each other, and the bottom surface faces the bearing portion. A side of the dial plate facing the bottom surface is provided with an identification texture; and the sensor is a texture sensor, and the texture sensor is configured to obtain texture information of the identification texture that moves synchronously during movement of the dial plate. It should be understood that, based on the analysis of the texture information, motion information such as the rotation direction and the rotation angle of the dial plate may be determined.

In some embodiments, the identification texture includes a plurality of grooves or a plurality of protrusions, and the plurality of grooves or the plurality of protrusions are disposed at equal intervals along the circumferential direction of the virtual rotation axis. Using the groove as an example, during the rotation of the dial plate, texture information such as depth or roughness of the groove obtained by the texture sensor is also different. Based on this, according to the texture information of the groove and intervals between the grooves, the rotation direction and the rotation angle of the dial plate that is dialed may be determined, so as to facilitate execution of a related program.

In some embodiments, each of the grooves or each of the protrusions includes a first surface, a second surface and a third surface that are sequentially connected; and there is an inclination angle $\theta$ between the first surface and the second surface, there is an inclination angle $\varphi$ between the second surface and the third surface, and the inclination angle $\theta$ and the inclination angle $\varphi$ are different in magnitude.

In some embodiments, the identification texture includes a plurality of groups of identification stripes with a gradual change in lengths, and the plurality of groups of identification stripes are disposed along a circumferential direction of the dial plate. It should be understood that the length refers to a size of the identification stripe in a radial direction of the dial plate, and the gradual change may include gradual increase or gradual decrease.

In some embodiments, the camera decoration component further includes a sliding member, and the sliding member is sandwiched between the dial plate and the dial plate, and is spaced apart from the positioning member. The sliding member may support the dial plate, and may improve the user's operation hand feeling when dialing the dial plate.

In some embodiments, the camera decoration component is provided with a Teflon tape on a surface of the sliding member. Based on this, a friction coefficient of a sliding sheet may be reduced, service life of the sliding sheet may be prolonged, and the operation hand feeling may be improved.

In some embodiments, the decoration member includes a first groove disposed along the circumferential direction of the virtual rotation axis, the dial plate includes a second groove disposed along the circumferential direction of the virtual rotation axis, and the second groove directly faces the first groove. The camera decoration component further includes a gasket: and the gasket is sandwiched between the first groove and the second groove, and is configured to implement rotatable connection between the dial plate and the decoration member.

In some embodiments, the gasket includes an annular portion, a first buckling portion, and a second buckling portion: and the first buckling portion is located on an inner side of the annular portion, and the second buckling portion is located on an outer side of the annular portion and is disposed alternately with the first buckling portion, where the first buckling portion is at least partially disposed in the first groove, and the second buckling portion is at least partially disposed in the second groove. Based on this, the gasket is elastically deformed and is sleeved on the decoration member, and sizes of the gasket in a radial direction may be further kept substantially the same, reducing the possibility that the gasket breaks under an external force, so that the service life of the gasket is prolonged.

In some embodiments, the induction member is made of magnetic iron, and the positioning member is made of magnetic metal or magnetic iron. In some other embodiments, the induction member is made of magnetic metal, and the positioning member is made of magnetic iron.

In some embodiments, the positioning member includes an elastic member and a ball, the elastic member and the ball are sequentially disposed in the first mounting groove, and the elastic member is pressed between the bearing portion and the ball, where in a case that the ball is engaged with the second mounting groove, the dial plate is controlled to be in the hovering state. It should be understood that the induction member may be completely accommodated in the second mounting groove, so that the ball may be engaged with a notch of the second mounting groove, thereby implementing hovering. In addition, when the dial plate is dialed, the ball is disengaged from the second mounting groove, and as the ball comes into contact with the bottom surface of the dial plate, the ball also rolls along with the rotation of the dial plate, so that a mechanical sound of dialing the dial plate is generated and the user experience is satisfied.

This application further provides a camera decoration component. The camera decoration component includes a rear cover and a camera decoration component that are fixedly connected. The camera decoration component includes a decoration member, a dial plate, a plurality of positioning members and a plurality of induction members; the dial plate is annular, and is sleeved on an outer peripheral side of the decoration member; and the decoration member includes a virtual rotation axis, and the dial plate is rotatably connected to the decoration member, and is configured to rotate around the virtual rotation axis of the decoration member. The plurality of positioning members are fixed to the decoration member and are disposed toward the dial plate, the plurality of positioning members are disposed at equal intervals along a circumferential direction of the virtual rotation axis, the plurality of induction members are fixed to the dial plate and are disposed toward the decoration member, and the plurality of induction members are disposed at equal intervals along the circumferential direction of the virtual rotation axis. The virtual rotation axis is used as a center of a circle, an angle between two adjacent positioning members is α, an angle between two adjacent induction members is β, and there is an integer multiple relationship between the angle α and the angle β; and during directly facing each other, the positioning member and the induction member are configured to control the dial plate to be in a hovering state. Through the cooperation between the dial plate and the decoration member, the electronic device includes a dial plate that is relatively rotatable, to make it convenient for a user to dial. It should be understood that, as a relatively independent component, the camera decoration component may be applied to an electronic device and be used as a part of the electronic device. By dialing the dial plate, an interaction function of the electronic device may be expanded to enrich the user experience in different use scenarios. For example, by dialing the dial plate, functions such as swiping a display page or flipping a display page may be implemented to expand man-machine interaction manners and help the user obtain related information of the display page conveniently and quickly.

In this application, by disposing structures such as a dial plate on a decoration member of a camera module, the interaction function of the electronic device may be expanded while the dial plate is dialed by the user, so as to improve the user experience of the electronic device and help the user implement functions such as one-handed operation.

BRIEF DESCRIPTION OF DRAWINGS

To illustrate the structural features and effects of the present invention more clearly, the following detailed description is given with reference to the accompanying drawings and specific embodiments.

DESCRIPTION OF EMBODIMENTS

The following clearly and completely describes technical solutions in the implementations of this application with reference to the accompanying drawings in the implementations of this application.

Generally, in electronic devices such as a mobile phone, as a screen size is getting increasingly large, a screen-to-body ratio is also gradually increasing. While satisfying the visual experience, it is increasingly inconvenient for a user to perform related operations through a screen of a mobile phone. For example, the user may not be capable of holding the mobile phone well with one hand. When performing an operation such as switching a photographing mode, changing a screen zoom ratio, or the like, the operation may need to be implemented in cooperation with the other hand.

In electronic devices such as a tablet computer, because a screen size of the tablet computer is originally relatively large, many operations performed by the user are each implemented by two hands.

It should be understood that, in the foregoing examples, for an electronic device with a relatively large screen size, it may be relatively inconvenient for a user to implement related operations, which affects the user experience to a certain extent. For some users with relatively small hands, the corresponding impact may be severer.

In addition, generally, electronic devices such as a mobile phone and a tablet computer have relatively few physical buttons. Therefore, these electronic devices also have relatively few functions that can be expanded through the physical buttons, and an actual experience effect of the user is also relatively poor.

Using a mobile phone as an example for description, the mobile phone may generally include a power button and a volume button. Correspondingly, the user may perform operations such as screening off and powering on and off through the power button; or the user may perform operations such as adjusting the volume and flipping a page through the volume button. However, generally functions expanded in a mobile phone based on these physical buttons are relatively limited, and cannot well meet the user's use requirements in different scenarios.

In addition, the screen size of the mobile phone is increased. In some cases, it is also relatively inconvenient for the user to press the power button and the volume button with a thumb or an index finger.

Figure 1:
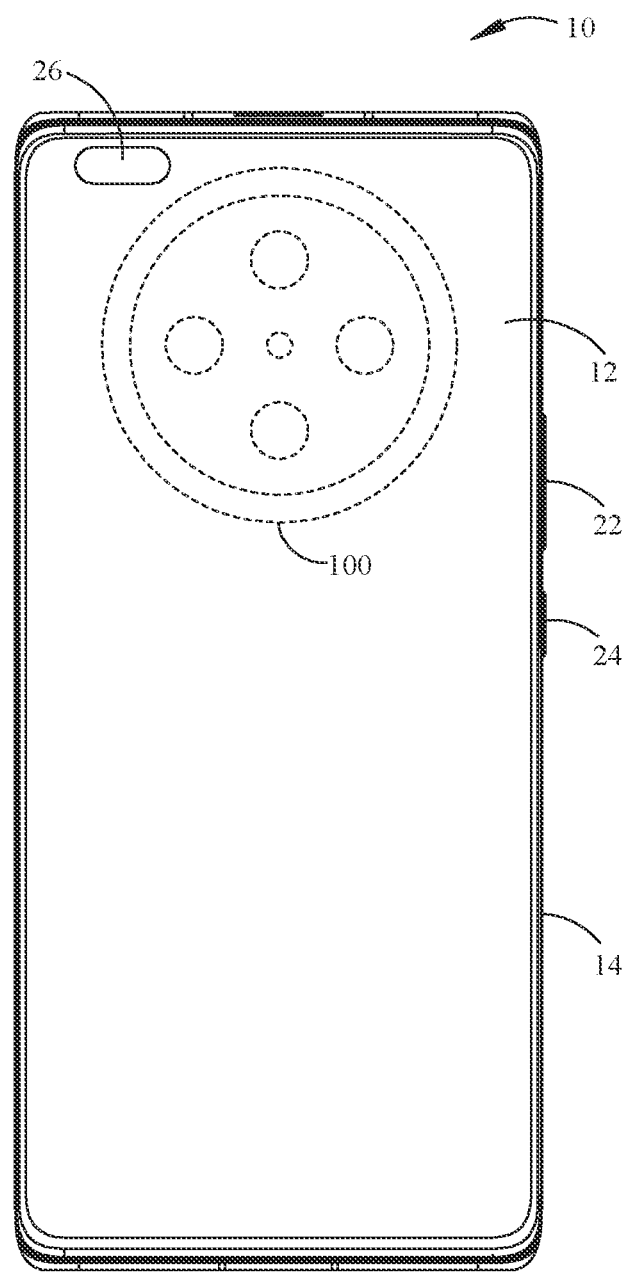
FIG. 1 is a front view of an electronic device according to an embodiment of this application.
Figure 2:
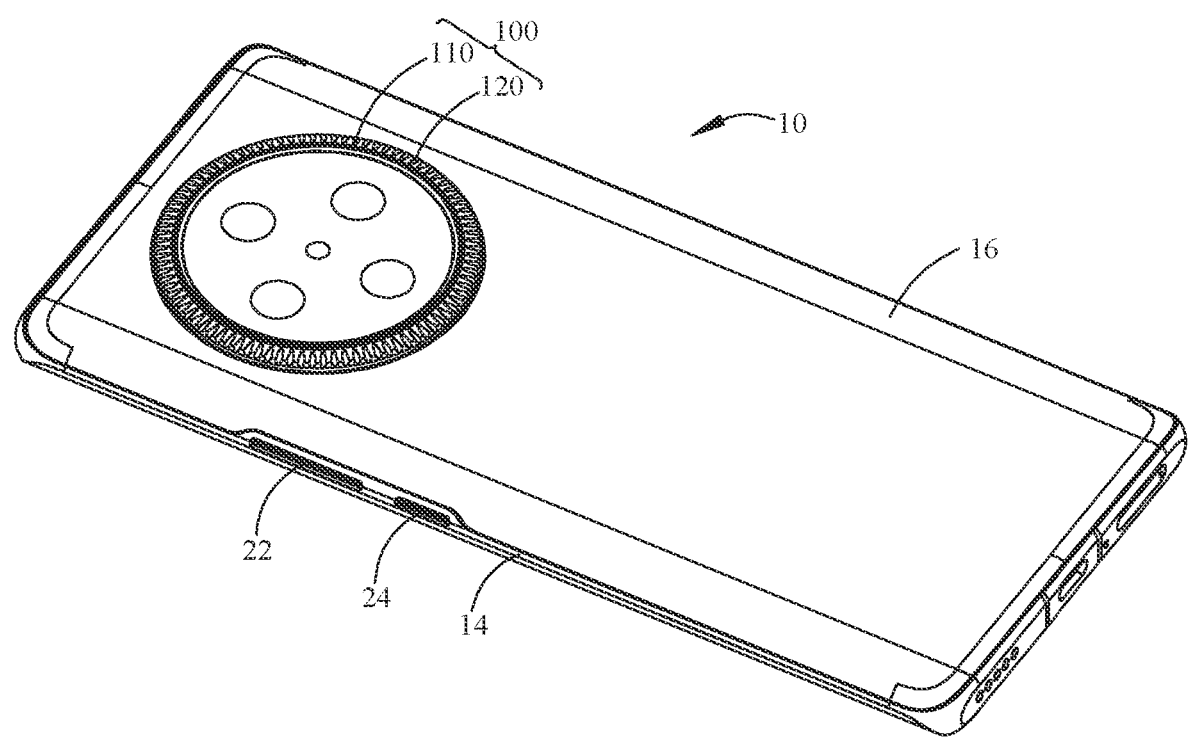
FIG. 2 is a rear perspective view of an electronic device according to an embodiment of this application.
Figure 3:
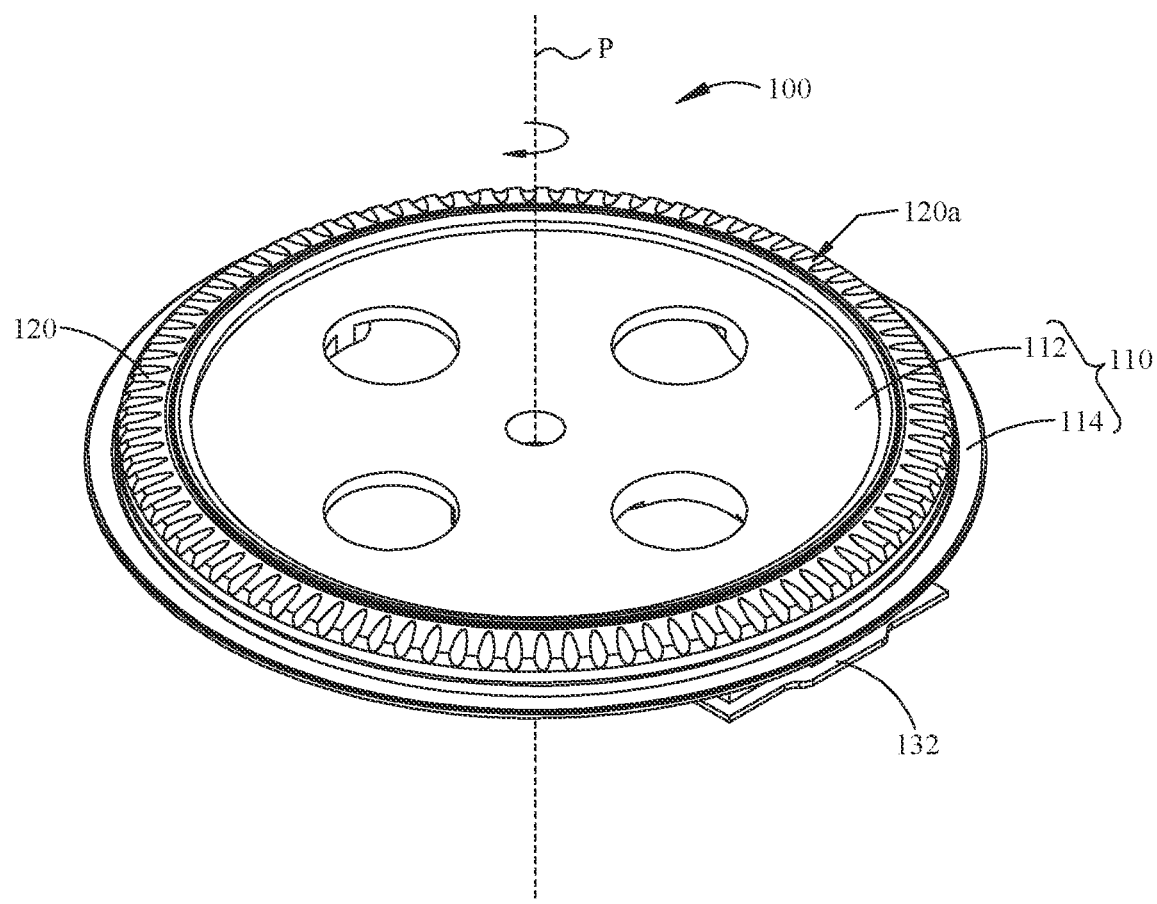
FIG. 3 is a perspective view of a camera decoration component according to an embodiment of this application.

Based on the foregoing problems, reference is made to FIG. 1 to FIG. 3 together. Embodiments of this application provide an electronic device 10, and the electronic device 10 includes a dial plate 120 and a decoration member 110 that are rotatably connected. The decoration member 110 may be a part of a camera decoration component 100. When dialed by a user, the dial plate 120 may rotate relative to the decoration member 110 of a camera. Based on the determination on a rotation direction and a rotation speed of the dial plate 120, the operation possibility of the electronic device 10 may be expanded, thereby enriching the user's interaction requirements in different use scenarios. For example, by dialing the dial plate 120, functions such as swiping a display page or flipping a display page may be implemented to expand man-machine interaction manners and help the user obtain related information of the display page conveniently and quickly.

Referring to FIG. 1 and FIG. 2 together, in some embodiments, the electronic device 10 includes a front cover 12, a middle bezel 14, and a rear cover 16. The front cover 12 may be a transparent cover plate to facilitate light emission. Correspondingly, a material of the front cover 12 may be glass or the like. The middle bezel 14 may be connected between the front cover 12 and the rear cover 16 to cooperate with the front cover 12 and the rear cover 16 to surround and form the interior of the electronic device 10, and may improve the structural strength of the electronic device 10. A material of the middle bezel 14 may be plastic, metal, or the like. For example, the middle bezel 14 may be an aluminum alloy middle bezel 14. The rear cover 16 may be a transparent or non-transparent cover plate, and a material of the rear cover 16 may be glass, ceramic, metal, or the like.

Referring to FIG. 2 and FIG. 3 together, the electronic device 10 may further include a volume button 22 and a power button 24, and the volume button 22 and the power button 24 may be disposed inside the electronic device 10. The middle bezel 14 is provided with holes (not shown in the figure) corresponding to the volume button 22 and the power button 24. Based on this, the volume button 22 and the power button 24 may partially protrude from the middle bezel 14 so as to respond to the user's related operations and execute a related program.

It should be understood that in some other embodiments, the volume button 22 may be further removed from the electronic device 10, and functions such as volume adjustment are implemented through the dial plate 120; or the dial plate 120 may cooperate with the power button 24 to implement functions such as quick screenshot and quick screen recording.

Referring to FIG. 1 again, in some embodiments, the electronic device 10 may further include a front camera component 26. The front camera component 26 may be placed inside the electronic device 10 and face the front cover 12, so as to implement functions such as face recognition, video chat, and the like.

In some embodiments, the electronic device 10 further includes a camera decoration component 100, and the camera decoration component 100 may be fixedly connected to the rear cover 16. A fixed connection manner may include bonding by an adhesive and fixing by dispensing, which is not limited in this application.

In some embodiments, from a relative position, the camera decoration component 100 may be located in an upper-middle region of the rear cover 16, for example, in the upper-middle region of the rear cover 16 of the mobile phone, so as to help the user dial. In some other embodiments, the camera decoration component 100 may be fixed in other regions of the rear cover 16 according to actual requirements, in addition to being located in the upper-middle region of the rear cover 16, which is not limited. For example, if the electronic device 10 is a tablet computer or another electronic device 10 with a relatively large screen size, the camera decoration component 100 may be located at an upper left corner or an upper right corner of the rear cover 16, so as to help the user dial.

Referring to FIG. 2 and FIG. 3 together, to expand the possibility of user operations, the camera decoration component 100 is provided with a dial plate 120 on an outer peripheral side of the decoration member 110. The dial plate 120 is substantially annular in shape, and is rotatably connected to the decoration member 110. It should be understood that the dial plate 120 may rotate around the decoration member 110 when being dialed. The rotation of the dial plate 120 may be understood as self-rotation of the dial plate 120. That is, the decoration member 110 includes a virtual rotation axis P, and the dial plate 120 may rotate around the rotation axis when being dialed. A direction along the virtual rotation axis P may be understood as an axial direction, a direction along the self-rotation/rotation of the dial plate 120 may be understood as a circumferential direction, and a direction perpendicular to the axial direction may be understood as a radial direction.

In addition, the electronic device 10 may further include a related sensor, for example, the sensor in FIG. 2 is, but is not limited to, a Hall sensor 132. It should be understood that, through the cooperation between the dial plate 120 and the related sensor, motion information such as a rotation direction and a rotation angle during dialing of the dial plate 120 may be obtained, thereby triggering related functions of software and meeting the user's use requirement. In addition, motion information such as speed/angular velocity during dialing of the dial plate 120 may be further obtained, so as to expand man-machine interaction functions.

Figure 4:
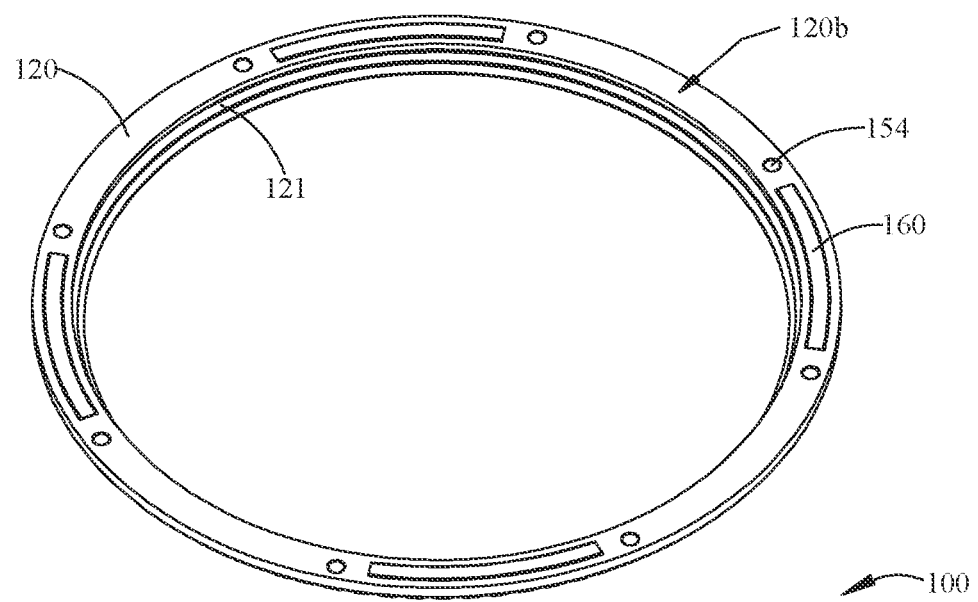
FIG. 4 is a perspective view of the camera decoration component in FIG. 3 with a dial plate taken out.
Figure 4:
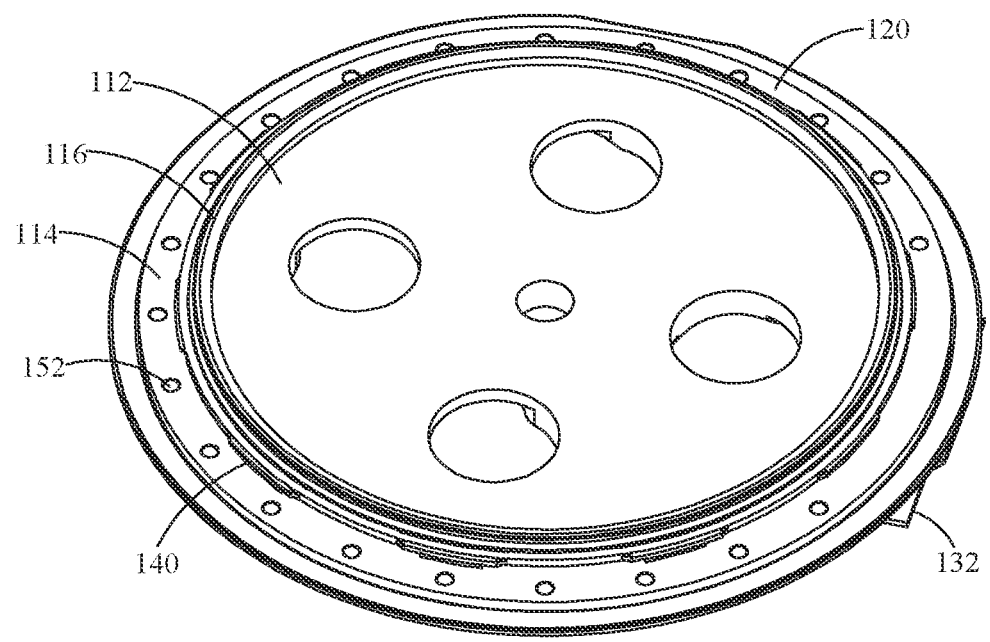

Referring to FIG. 3 and FIG. 4 together, in some embodiments, the decoration member 110 includes a main body portion 112 and a bearing portion 114 surrounding the main body portion 112. A shape of the main body portion 112 is substantially cylindrical, and the bearing portion 114 is located on an outer side of the main body portion 112 and is disposed around the main body portion 112. A shape of the bearing portion 114 is substantially annular, and structures such as the dial plate 120 may be disposed on the bearing portion. A material of the decoration member 110 may be aluminum alloy, or the like, and a material of the dial plate 120 may be, for example, aluminum alloy or stainless steel, which is not limited.

To implement the rotatable connection between the decoration member 110 and the dial plate 120, the camera decoration component 100 further includes a gasket 140. The gasket 140 is disposed on the bearing portion 114 of the decoration member 110 and is sandwiched between the main body portion 112 and the dial plate 120. A material of the gasket 140 may be POM (Polyoxymethylene. Polyoxymethylene), PET, or the like.

Figure 5:
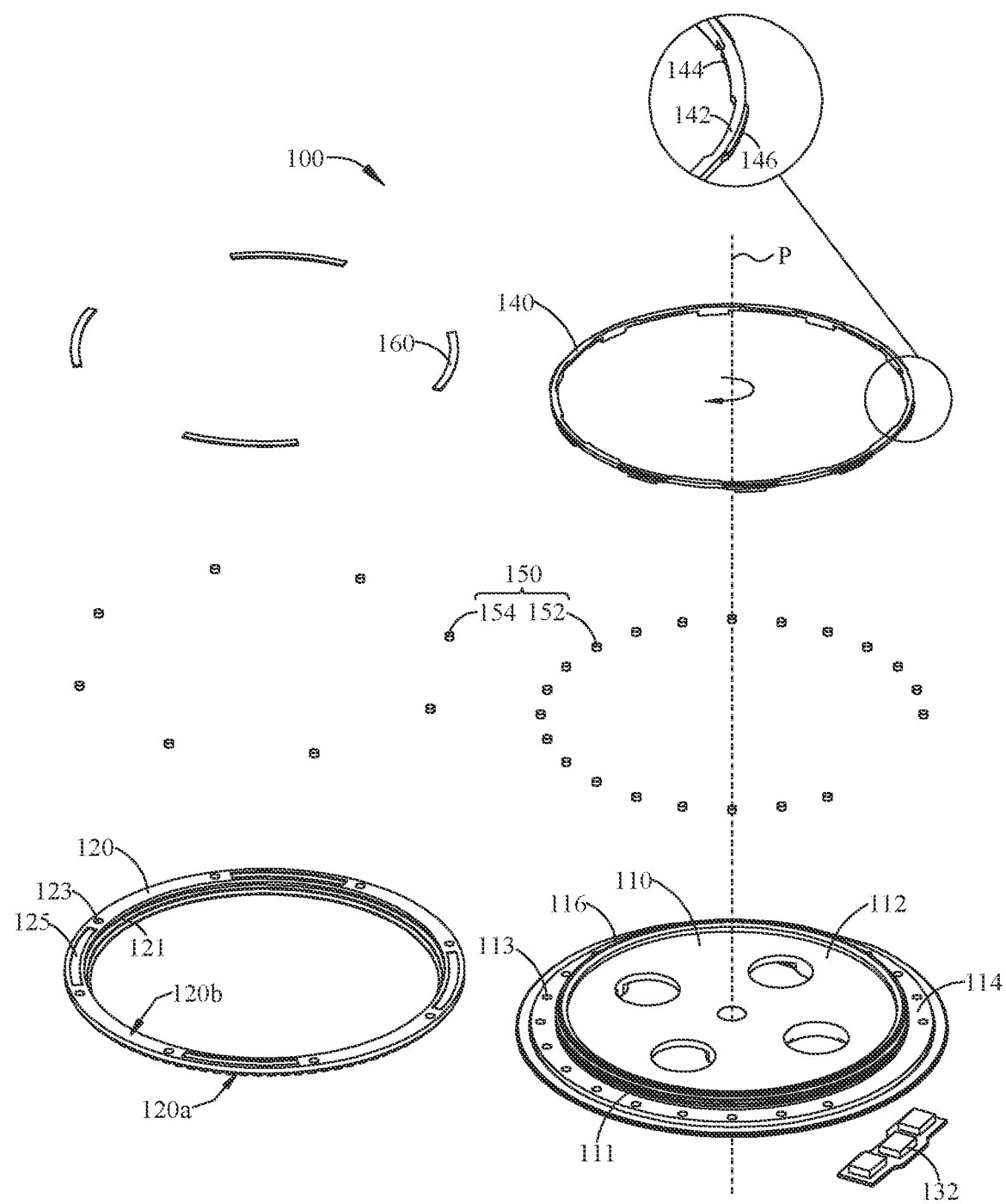
FIG. 5 is an exploded view of a camera decoration component according to an embodiment of this application.
Figure 6:
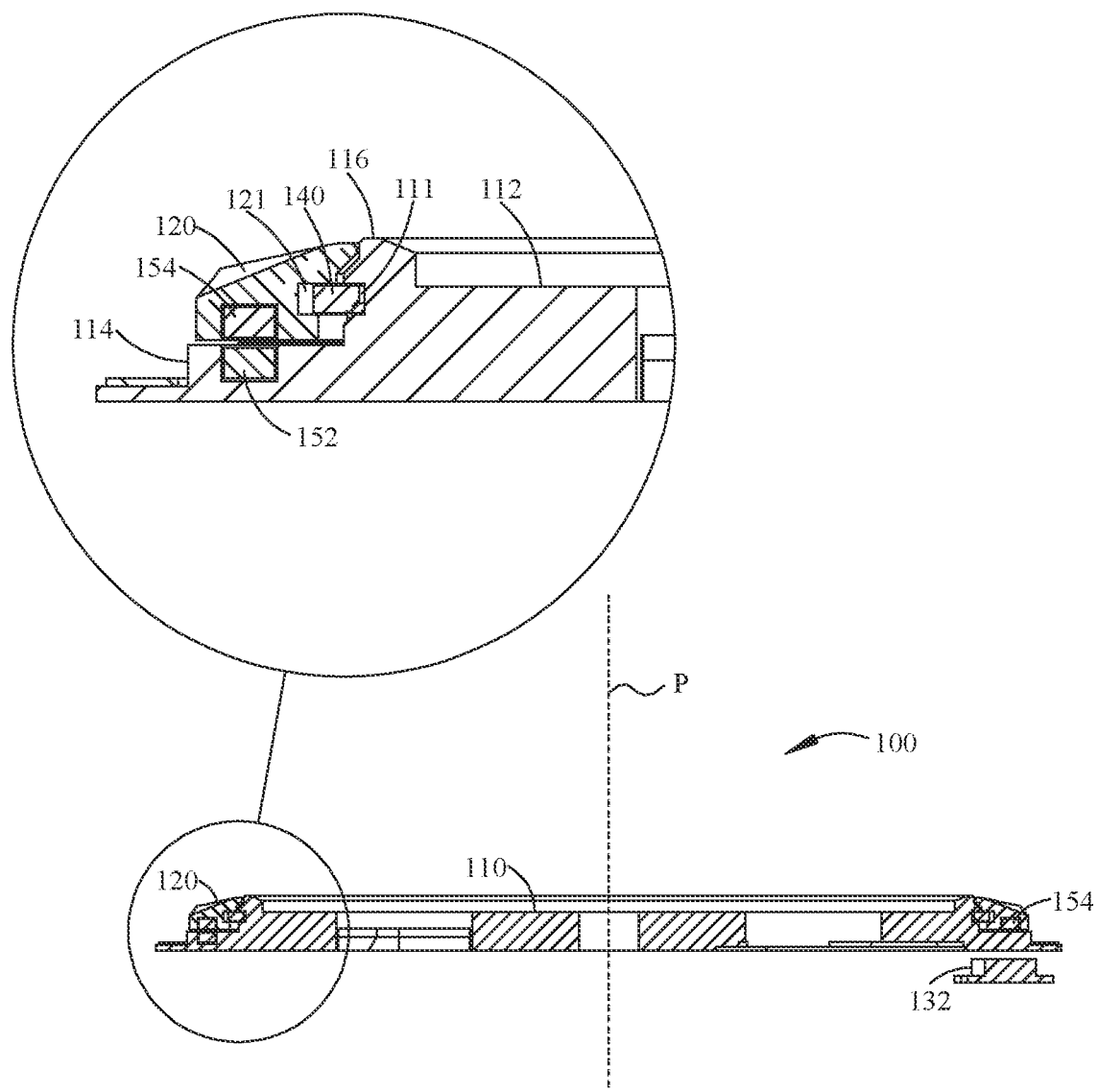
FIG. 6 is a cross-sectional view of a camera decoration component according to an embodiment of this application.

Referring to FIG. 5 and FIG. 6 together, in some embodiments, to facilitate the mounting of the camera decoration component 100, the gasket 140 may include an annular portion 142, a first buckling portion 144, and a second buckling portion 146. The first buckling portion 144 is located on an inner side of the annular portion 142, and the second buckling portion 146 is located on an outer side of the annular portion 142. As shown in FIG. 5, along a circumferential direction of the annular portion 142, the first buckling portion 144 and the second buckling portion 146 are disposed alternately. Based on this, the gasket 140 is elastically deformed and is sleeved on the decoration member 110, and sizes of the gasket 140 in a radial direction may be further kept substantially the same, reducing the possibility that the gasket 140 breaks under an external force, so that service life of the gasket 140 may be further prolonged.

In some embodiments, to cooperate with the first buckling portion 144 of the gasket 140, a first groove 111 may be disposed on an outer side of the main body portion 112. The first groove 111 may be disposed along a circumferential direction of the virtual rotation axis P, and may be configured to implement the rotatable connection between the decoration member 110 and the dial plate 120.

In some embodiments, to cooperate with the second buckling portion 146 of the gasket 140, the dial plate 120 is further provided with a second groove 121. The second groove 121 may be disposed along a circumferential direction of the virtual rotation axis P, and may be opposite to the first groove 111 of the decoration member 110. Based on this, the first buckling portion 144 of the gasket 140 may at least partially extend into the first groove 111, and the second buckling portion 146 of the gasket 140 may also at least partially extend into the second groove 121. In this way, the dial plate 120 may be mounted on the decoration member 110, and the rotatable connection between the dial plate 120 and the decoration member 110 may be implemented.

Referring to FIG. 5 and FIG. 6 together again, in some embodiments, the main body portion 112 is provided with a boss 116 in an axial direction along the virtual rotation axis P, and the boss 116 is disposed around an inner side of the dial plate 120. It should be understood that after the dial plate 120 is mounted, the boss 116 may protrude relative to the dial plate 120. Based on this, the boss 116 may protect the dial plate 120 to a certain extent, so as to reduce the possibility that the dial plate 120 is bumped and deformed by a force.

In some embodiments, the electronic device 10 may further include a camera (not shown in the figure) and a glass sheet (not shown in the figure), and the camera decoration component is disposed between the camera and the glass sheet. The main body portion 112 of the decoration member 110 may be equipped with the glass sheet, so as to cooperate with the glass sheet to protect the camera. The main body portion 112 is further provided with a through hole (not marked) in a region corresponding to the glass sheet, and the through hole may directly face a lens of the camera, so that the camera may obtain external information. It should be understood that after the glass sheet is mounted, the boss 116 may be located between the glass sheet and the dial plate 120; and similarly, the boss 116 may protrude relative to the glass sheet, so as to reduce the possibility that the glass sheet is bumped and worn.

Referring to FIG. 3 and FIG. 4 together again, in some embodiments, the dial plate 120 includes a top surface 120a and a bottom surface 120b opposite to each other. The top surface 120a is a surface of the dial plate 120 away from the bearing portion 114, and is also a surface of the dial plate 120 that the user may touch; and the bottom surface 120b is a surface of the dial plate 120 facing the bearing portion 114. It should be understood that, to help the user dial the dial plate 120, the top surface 120a of the dial plate 120 may include a texture to increase a frictional force when the user comes into contact with the dial plate 120.

In some embodiments, the dial plate 120 may further include a side surface. The side surface may be connected between the top surface 120a and the bottom surface 120b, and is also a surface of the dial plate 120 that the user may touch. Similar to the top surface 120a, the side surface may also include a texture to help the user dial the dial plate 120.

In some embodiments, the top surface 120a of the dial plate 120 may be an inclined surface inclined relative to the bottom surface 120b, and the side surface is perpendicular to the bottom surface 120b; and a cross-section of the dial plate 120 is trapezoidal as a whole. In some other embodiments, the top surface 120a of the dial plate 120 may be an inclined surface inclined relative to the bottom surface 120b, and is directly connected to the bottom surface 120b; and a cross-section of the dial plate 120 is triangular as a whole.

In some other embodiments, the top surface 120a of the dial plate 120 may be an arc-shaped surface, and the top surface 120a is curved and is directly connected to the bottom surface 120b. In this embodiment, the dial plate 120 may not include the side surface in the foregoing embodiments.

Referring to FIG. 4 and FIG. 5 together again, in some embodiments, to implement hovering of the dial plate 120, the camera decoration component 100 further includes a hovering mechanism 150, and the hovering mechanism 150 may enable the dial plate 120 to hover after rotating by a preset angle. For example, under an external force and in cooperation with the hovering mechanism 150, every time the dial plate 120 rotates by 9°, 10°, 20°, 30°, or 45°, the dial plate hovers once. It should be understood that the preset angle may be different according to a setting of the hovering mechanism 150, which is not limited.

In some embodiments, the hovering mechanism 150 may include a positioning member 152 and an induction member 154, at least one of the positioning member 152 and the induction member 154 is made of magnetic iron, and the other is a structure that may generate a magnetic force with the magnet. Based on this, through the cooperation between the positioning member 152 and the induction member 154, hovering of the dial plate 120 may be implemented, and the user's operation hand feeling may be improved.

In some embodiments, the induction member 154 may be made of magnetic iron, and the positioning member 152 may be made of magnetic metal, but is not limited thereto. In some other embodiments, the induction member 154 may be made of magnetic metal, and the positioning member 152 may be made of magnetic iron; or the induction member 154 and the positioning member 152 may both be made of magnetic iron. The magnetic metal may be, for example, iron, nickel, cobalt, or the like.

It should be understood that, to implement the mounting of the positioning member 152 and the induction member 154, a side of the bearing portion 114 of the decoration member 110 facing the dial plate 120 is provided with a first mounting groove 113, and the positioning member 152 is disposed in the first mounting groove 113 and correspondingly faces the dial plate 120; and a side of the dial plate 120 facing the bearing portion 114 is provided with a second mounting groove 123, and the induction member 154 is disposed in the second mounting groove 123 and correspondingly faces the bearing portion 114 of the decoration member 110. Based on the first mounting groove 113 and the second mounting groove 123, thicknesses of the dial plate 120, the camera decoration component 100, and the like may be further better controlled while the induction member 154 and the positioning member 152 are correspondingly mounted. When the camera decoration component 100 is applied to an electronic device 10, in addition to expanding interaction functions, space occupied by the interior of the electronic device 10 may be reduced and a thickness of the camera decoration component 100 protruding from the rear cover 16 may be controlled, so that an overall thickness of the electronic device 10 may be easily controlled.

In some embodiments, using the induction member 154 made of magnetic iron and the positioning member 152 made of magnetic metal as an example, there are a plurality of induction members 154, and the plurality of induction members 154 may be evenly disposed around the dial plate 120. For example, the plurality of induction members 154 may be symmetrically and regularly disposed around the dial plate 120. For example, along the circumferential direction of the dial plate 120, the plurality of induction members 154 may be disposed at equal intervals along the circumferential direction of the virtual rotation axis P. Alternatively, the plurality of induction members 154 may not be all disposed at equal intervals along the circumferential direction of the virtual rotation axis P. It should be understood that in this embodiment, a distance between each two adjacent induction members 154 may be approximately the same, and within an allowable range of error, rotation and hovering of the dial plate 120 may also be implemented.

Corresponding to the plurality of induction members 154 on the dial plate 120, the quantity of positioning members 152 may be more than one. The plurality of positioning members 152 may be symmetrically and regularly disposed around the bearing portion 114 of the decoration member 110. For example, along the circumferential direction of the bearing portion 114, some positioning members of the plurality of positioning members 152 are disposed at equal intervals along the circumferential direction of the virtual rotation axis P. Based on this, corresponding to the plurality of induction members 154 in the foregoing embodiments, the plurality of positioning members 152 may not be all disposed at equal intervals along the circumferential direction of the virtual rotation axis P. It should be understood that in this embodiment, a distance between each two adjacent positioning members 152 may be approximately the same, so as to directly face the induction member 154. In this way, the rotation and hovering of the dial plate 120 may be implemented within an allowable range of error. According to actual requirements, a plurality of positioning members 152 may circumferentially surround the bearing portion 114. Alternatively, a plurality of positioning members 152 may be disposed around the bearing portion 114 in an arc. It may be understood that, to obtain motion information of the dial plate 120, components such as the Hall sensor 132 may be correspondingly disposed in a region of the bearing portion 114 where the positioning member 152 is not disposed.

Figure 7:
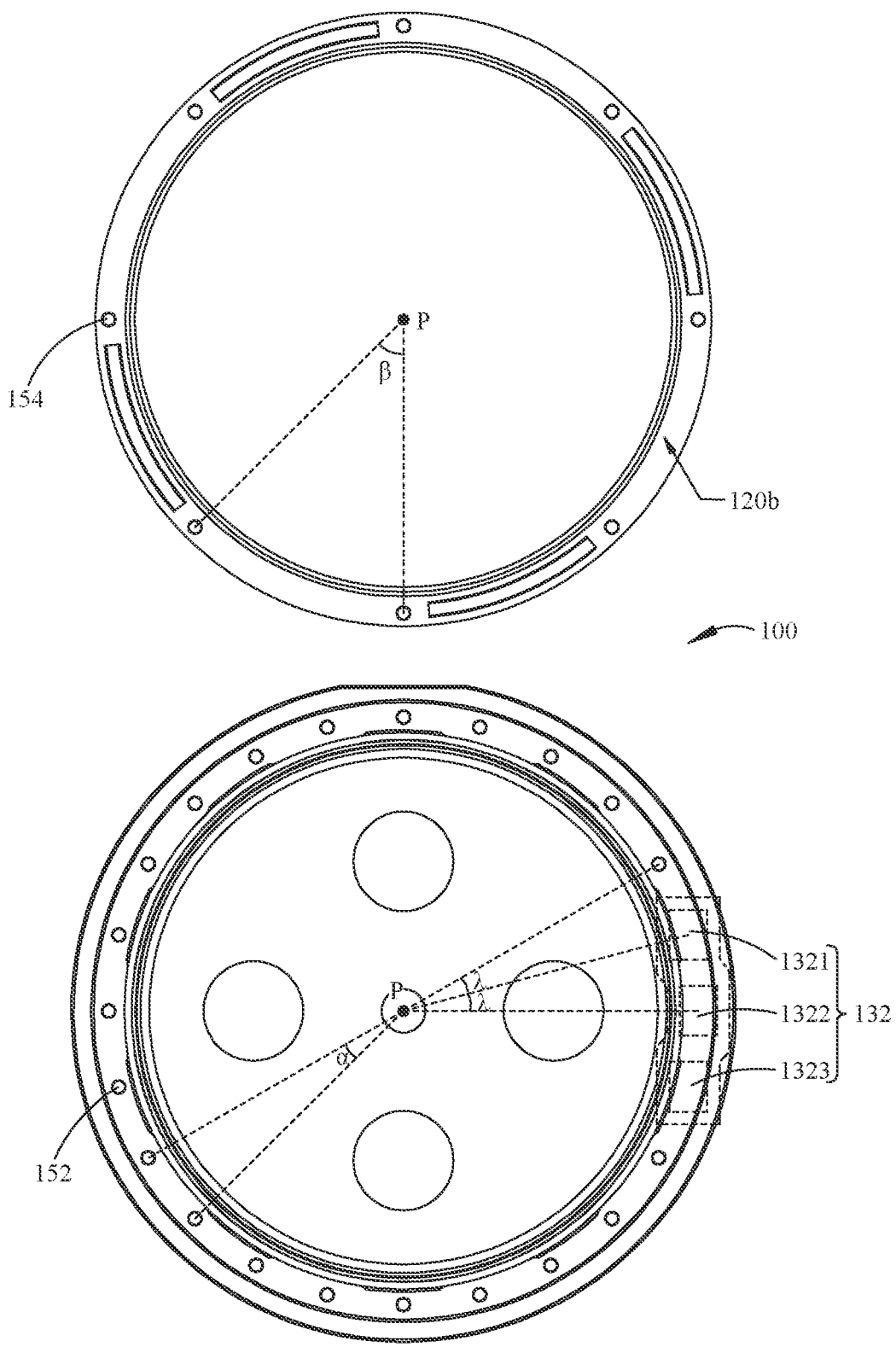
FIG. 7 is a schematic diagram of a camera decoration component with a dial plate taken out.

Referring to FIG. 7, in some embodiments, the quantity of positioning members 152 is A; and the virtual rotation axis P of the decoration member 110 is used as a center of a circle, and an angle between two adjacent positioning members 152 is α. The quantity of induction members 154 is B; and the virtual rotation axis P of the decoration member 110 is used as a center of a circle, and an angle between two adjacent induction members 154 is β. It should be understood that, considering that the dial plate 120 may hover after rotating by a preset angle, there is a multiple relationship between the angle α and the angle β, that is, α=β*N or β=α*M, where N and M are both positive integers. For example, if the angle α is 15°, and the angle β is 45°, then β=α*3.

Generally, a smaller angle of the angle α and the angle β may be understood as a preset angle. Correspondingly, every time the dial plate 120 rotates by 152 under an external force, the induction member 154 on the dial plate 120 may directly face the positioning member 152 on the decoration member 110. In a case that the induction member directly faces the positioning member, the dial plate 120 may hover at a current position under magnetic forces of the induction member 154 and the positioning member 152, so that every time the dial plate 120 rotates by 15°, the dial plate may hover once.

It should be understood that when the induction member 154 directly faces the positioning member 152, the dial plate 120 may be controlled to be in a hovering state. When there is a certain external force, the external force may enable the dial plate 120 to rotate and be out of the hovering state, and the induction member 154 does not directly face the positioning member 152. In this case, based on the magnetic force between the induction member 154 and the positioning member 152, the dial plate 120 still tends to return to the hovering state again. When the external force weakens or disappears, based on the magnetic force between the induction member 154 and the positioning member 152, the dial plate 120 may automatically rotate and enable the induction member 154 to directly face the positioning member 152 again, and the dial plate 120 is in the hovering state again. Based on this, quick dialing and quick hovering of the dial plate 120 may be implemented, and the user's operation hand feeling may be improved.

In some embodiments, corresponding to the multiple relationship between the angle α and the angle β, the quantity A of the positioning members 152 may be N times the quantity B of the induction members 154, that is, A=B*N. It should be understood that a smaller value of the angle α corresponds to a larger quantity of required positioning members 152; and the angle β may be understood by analogy, and is not repeated herein.

In some embodiments, the positioning member 152 circumferentially surrounds the bearing portion 114 of the decoration member 110 as a whole, and the induction member 154 circumferentially surrounds the dial plate 120 as a whole. For example, the angle α is 15", and the angle β is 45'. β=α*3, A=360°/15°=24, and B=360°/45°=8. In this case, the quantity A of the positioning members 152 is 3 times the quantity B of the induction members 154. In another example, the angle α is 9°, and the angle β is 36°. β=α*4, A=360°/9°=40, and B=360°/36°=10. In this case, the quantity A of the positioning members 152 is 4 times the quantity B of the induction members 154.

In some other embodiments, the positioning member 152 surrounds the bearing portion 114 of the decoration member 110 in an arc as a whole, and the induction member 154 circumferentially surrounds the dial plate 120 as a whole. It should be understood that, based on an arrangement manner of the arc, a certain region may be further reserved on the bearing portion 114, that is, the positioning member 152 is not disposed in this region, so as to facilitate arrangement of components such as a sensor. For example, the angle α is 15°, the arc is five sixths of a circumference (that is, an angle of the arc is 300°), and the angle β is 45°. β=α*3, A=300°/15°+1=21, and B=360°/45°=8. In this case, about one sixth of the region on the bearing portion 114 is reserved. In another example, if the angle α is 152, and an angle of the arc is 330°, then the quantity of positioning members 152 is A=330°/15°+1=23. In this case, about one twelfth of the region on the bearing portion 114 is reserved.

It should be understood that when the positioning member 152 surrounds the dial plate 120 in an arc, the angle α between adjacent positioning members 152 may be adaptively adjusted according to factors such as a size of the dial plate 120, design requirements, and rotation sensitivity of the dial plate 120, which is not limited.

Referring to FIG. 4 and FIG. 5 together again, in some embodiments, the camera decoration component 100 further includes a sliding member 160. The sliding member 160 may be sandwiched between the dial plate 120 and the bearing portion 114 of the decoration member 110 to support the dial plate 120 and improve the operation hand feeling when the dial plate 120 is dialed. According to the types and quantities of the induction members 154 and the positioning members 152, the sliding member 160 may be disposed on the dial plate 120 or the bearing portion 114, and may be correspondingly disposed around the dial plate 120 or the bearing portion 114. Using FIG. 4 and FIG. 5 as an example, the induction member 154 is made of magnetic iron, the positioning member 152 is made of magnetic metal, and the quantity of the positioning members 152 is greater than the quantity of the induction members 154. Based on this, the sliding member 160 may be disposed on the dial plate 120 and be spaced apart from the induction member 154. Corresponding to the sliding member 160, the dial plate 120 may be further provided with a slot 125, and the slot 125 is spaced apart from the second mounting groove 123. The sliding member 160 may partially extend into the slot 125 to mount the sliding member 160.

In some embodiments, the quantity of the sliding members 160 may be two or more. For example, the quantity of the sliding members 160 is three, four, or five. It should be understood that, in some cases, under a magnetic force of the hovering mechanism 150, the user needs to exert a certain force to dial the dial plate 120, which may reduce the possibility that the dial plate 120 is dialed by mistake. Based on the cooperation between the hovering mechanism 150 and the sliding member 160, it can be ensured that the user has a relatively smooth and coherent dialing hand feeling when dialing the dial plate 120, so as to improve the user experience of dialing the dial plate 120.

In some embodiments, the sliding member 160 may be a spacer, for example, the sliding member 160 may be, but not limited to, a POM spacer. In addition, a surface of a sliding sheet may be further provided with a film layer such as a Teflon tape, to reduce a friction coefficient of the sliding sheet, prolong service life of the sliding sheet, and improve the operation hand feeling.

Referring to FIG. 6 and FIG. 7 together, in some embodiments, as described above, the camera decoration component 100 may further include the Hall sensor 132, and the Hall sensor 132 may obtain related motion information of the dial plate 120 by sensing a change of the magnetic field. In this embodiment, the induction member 154 is made of magnetic iron, and the positioning member 152 is made of magnetic metal. The Hall sensor 132 is correspondingly disposed on a side of the bearing portion 114 away from the dial plate 120, or the Hall sensor 132 may be correspondingly disposed on a side of the bearing portion 114 facing the dial plate 120. As shown in FIG. 7, it should be understood that the positioning member 152 surrounds the bearing portion 114 of the decoration member 110 in an arc as a whole, while the Hall sensor 132 and the positioning member 152 may circumferentially surround the bearing portion 114 as a whole.

When the dial plate 120 is in the hovering state, the Hall sensor 132 may directly face the induction member 154 located on the dial plate 120. When the dial plate 120 rotates and is out of the hovering state, the induction member 154 mounted on the dial plate 120 also synchronously rotates. Using the Hall sensor 132 as a reference, a position of the induction member 154 directly facing the Hall sensor 132 changes; and based on a change of the position, the corresponding magnetic field information obtained by the Hall sensor 132 also changes. Based on this, the motion information of the dial plate 120 may be correspondingly obtained after a processor processes the magnetic field information. Therefore, when the dial plate 120 rotates, the Hall sensor 132 senses a change of the magnetic field, and information such as the rotation direction and the rotation angle of the dial plate 120 may be obtained to trigger a corresponding function of software.

It should be understood that when the Hall sensor 132 is located on a side of the bearing portion 114 away from the dial plate 120, a part of the bearing portion 114 is disposed between the Hall sensor 132 and the induction member 154. However, because the part of the bearing portion 114 is not provided with the positioning member 152, the Hall sensor 132 may still relatively stably obtain the change of the magnetic field of the induction member 154 to obtain the motion information of the dial plate 120 and trigger the corresponding function of the software.

Referring to FIG. 7, in some embodiments, using the quantity of the Hall sensors 132 being more than one as an example for description, the plurality of Hall sensors 132 are sequentially disposed at intervals along the circumferential direction of the bearing portion 114. The virtual rotation axis P of the decoration member 110 is used as a center of a circle. The angle between the adjacent Hall sensors 132 and the angle between the Hall sensor 132 on the edge and the adjacent positioning member 152 are both λ, and the angle λ is the same as the angle α. Based on the positional relationship, whenever the dial plate 120 is in the hovering state, the Hall sensor 132 may directly face the induction member 154; and whenever the dial plate 120 rotates, the magnetic field information of the induction member 154 is obtained by the Hall sensor 132, and the electronic device 10 may determine that the dial plate 120 rotates, so as to execute a corresponding program.

In some embodiments, the virtual rotation axis P of the decoration member 110 is used as a center of a circle. A quotient N of the angle β between the adjacent induction members 154 by the angle α between the adjacent positioning members 152 is equal to the quantity of Hall sensors 132, where N is a positive integer greater than 2. For example, N is 3, 4, or 5. For example, if the angle α is 15°, the angle β is 45°, and β=α*3, the quantity of Hall sensors 132 is three. In another example, if the angle α is 9°, the angle β is 45°, and β=α*5, the quantity of Hall sensors 132 is five. It should be understood that, based on the quantitative relationship, whenever the dial plate 120 hovers, it may be ensured that one of the N Hall sensors 132 may directly face the induction member 154, so that the Hall sensor 132 may obtain magnetic field information, where the magnetic field information may include signal change information of the N Hall sensor 132. Correspondingly, the processor may process the magnetic field information of the Hall sensor 132 to determine motion information such as a rotation direction and a rotation angle of the dial plate 120.

Referring to FIG. 7, in some embodiments, the quantity of Hall sensors 132 may be three, that is, N=3. The three Hall sensors 132 may be sequentially disposed at intervals along the circumferential direction of the bearing portion 114. It should be understood that, as shown in FIG. 7, in a clockwise direction, the Hall sensors 132 include a first Hall sensor 1321, a second Hall sensor 1322, and a third Hall sensor 1323. The dial plate 120 is initially in the hovering state, the first Hall sensor 1321 may directly face one induction member 154. When the dial plate 120 is in the hovering state again after rotating by 15° clockwise, the second Hall sensor 1322 may directly face the induction member 154. When the dial plate 120 is in the hovering state again after continuing to rotate by 15° clockwise, the third Hall sensor 1323 may directly face the induction member 154. When the dial plate 120 is in the hovering state again after continuing to rotate by 15° clockwise, the first Hall sensor 1321 may directly face another induction member 154, and at this point, the dial plate 120 stops rotating. During the rotation of the dial plate 120, through a changing sequence of magnetic field signals of the first, second, and third Hall sensors (1321, 1322, 1323), it may be determined that a rotation direction of the dial plate 120 is the clockwise direction, and a total rotation angle of the dial plate 120 is 45°. In addition, based on the operation of the processor, motion information such as a rotation speed of the dial plate 120 may be further obtained.

Figure 8:
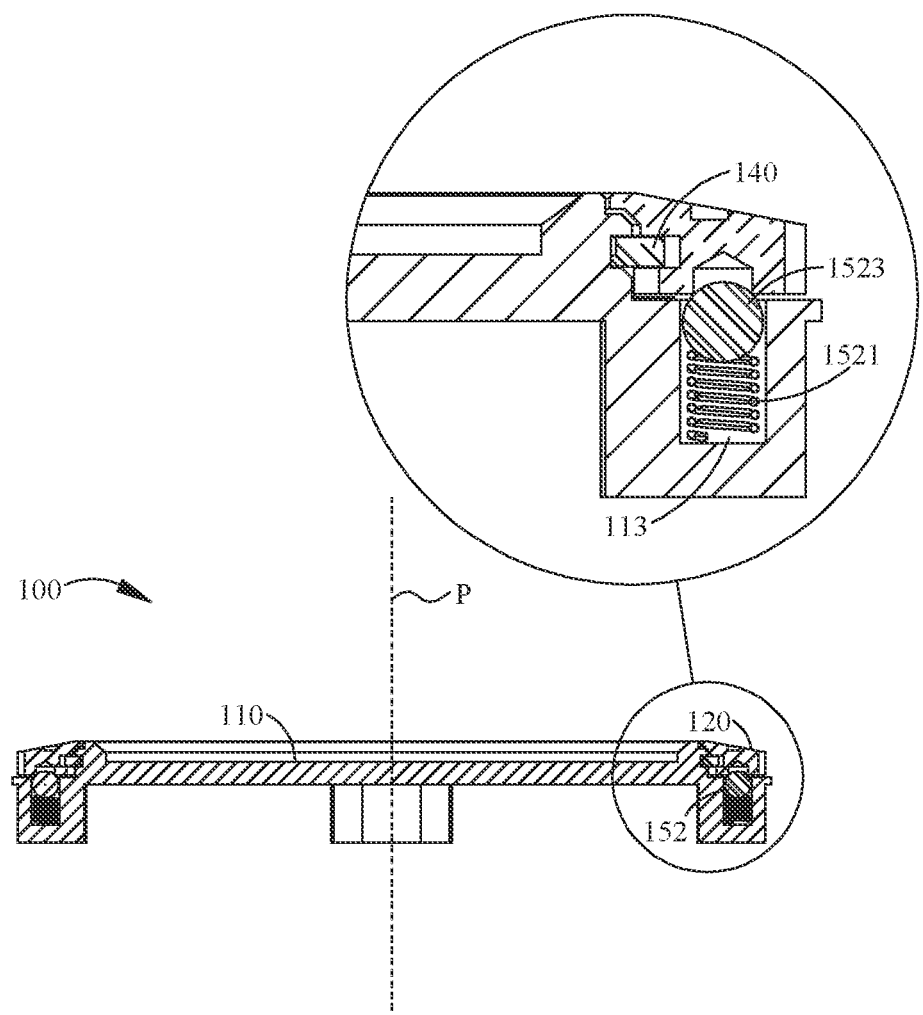
FIG. 8 is a cross-sectional view of a camera decoration component according to another embodiment of this application.

As shown in FIG. 8, in some other embodiments, the positioning member 152 may include an elastic member 1521 and a ball 1523, and the elastic member 1521 and the ball 1523 are sequentially disposed in the first mounting groove 113, where the elastic member 1521 is pressed between a groove bottom of the first mounting groove 113 and the ball 1523. Based on a force of the elastic member 1521 on the ball 1523, the ball 1523 may be pressed against the bottom surface 120b of the dial plate 120. By bouncing the ball 1523 between the second mounting grooves 123, the hovering of the dial plate 120 may also be implemented. It should be understood that in this embodiment, the induction member 154 may be completely accommodated in the second mounting groove 123, so that the ball 1523 may be engaged with a notch of the second mounting groove 123, thereby implementing hovering. In addition, when the dial plate 120 is dialed, the ball 1523 is disengaged from the second mounting groove 123, and as the ball 1523 comes into contact with the bottom surface 120b of the dial plate 120, the ball 1523 also rolls along with the rotation of the dial plate 120, so that a mechanical sound of dialing the dial plate 120 is generated.

In some other embodiments, corresponding to the positioning member 152 including the elastic member 1521 and the ball 1523, the hovering mechanism 150 may alternatively not include the induction member 154, which may also implement functions such as rotation and hovering of the dial plate 120.

Figure 9:
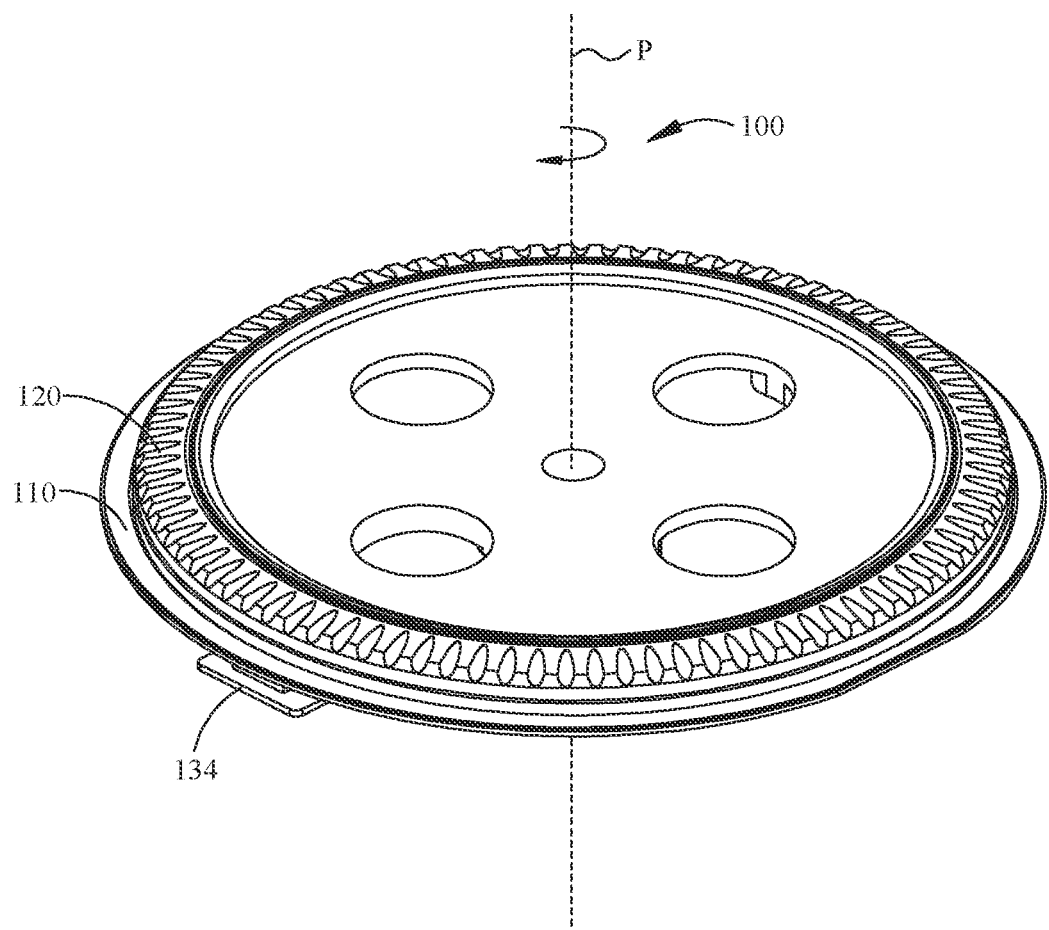
FIG. 9 is a perspective view of a camera decoration component according to another embodiment of this application.
Figure 10:
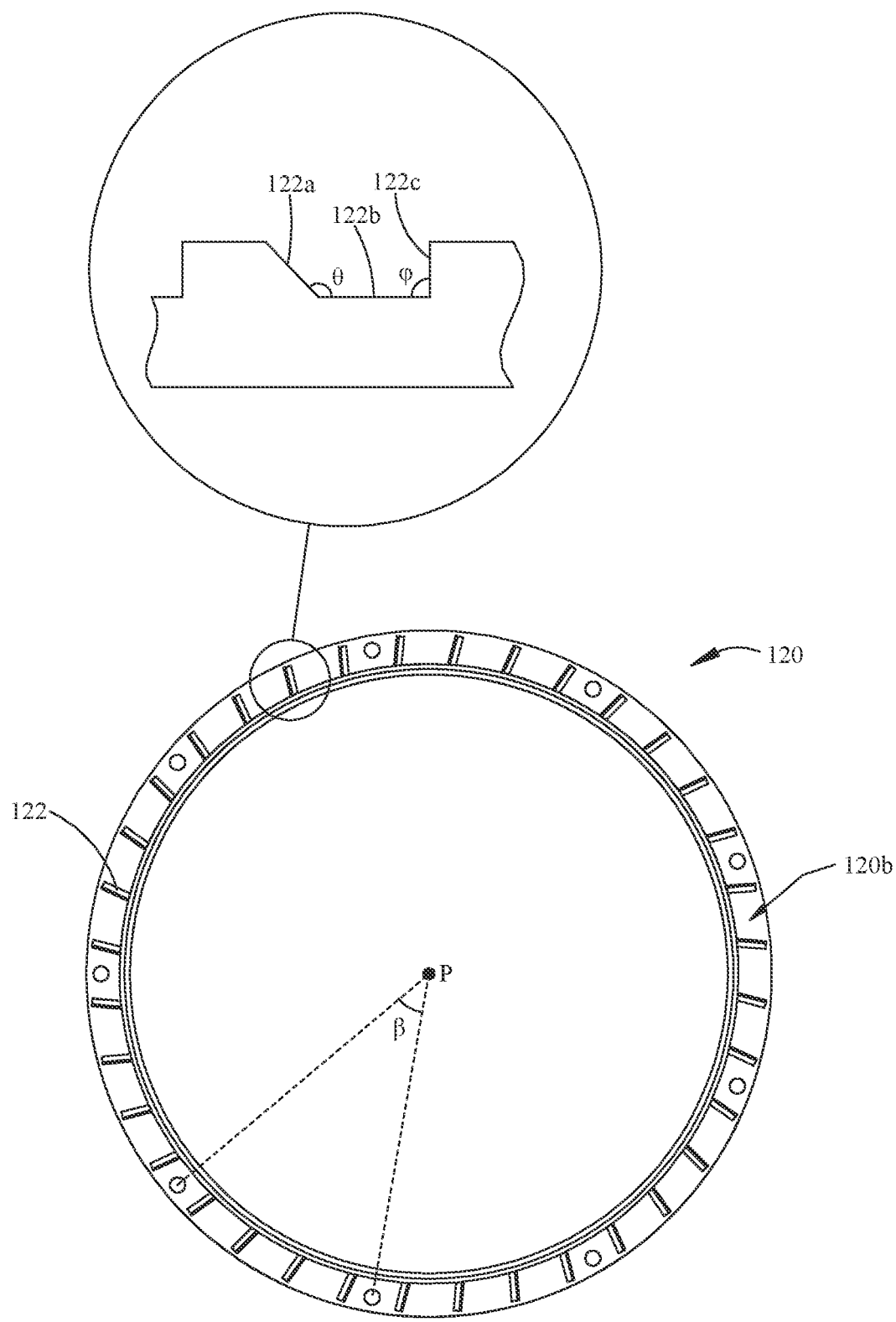
FIG. 10 is a schematic diagram of a dial plate according to another embodiment of this application.

Referring to FIG. 9 and FIG. 10, in some other embodiments, to obtain motion information of the rotation of the dial plate 120, the camera decoration component 100 may include a texture sensor 134. Similar to the Hall sensor 132 in FIG. 7, the texture sensor 134 is correspondingly disposed on a side of the bearing portion 114 facing away from the dial plate 120, or the texture sensor 134 may be correspondingly disposed on a side of the bearing portion 114 facing the dial plate 120. It should be understood that the texture sensor 134 may obtain texture information of the bottom surface 120b of the dial plate 120 to determine motion information such as the rotation direction and the rotation angle of the dial plate 120. Because the texture sensor 134 and the Hall sensor 132 identify a rotation direction in different manners, aspects such as determining the rotation direction may be implemented by a texture sensor 134.

To cooperate with the texture sensor 134 to obtain the texture information of the bottom surface 120b of the dial plate 120, a side of the dial plate 120 facing the bottom surface 120b is provided with an identification texture 122. The identification texture 122 may include grooves, protrusions, or the like, which are spaced apart along the circumferential direction of the dial plate 120. The groove or protrusion includes a certain inclination angle and depth, so that the texture sensor 134 may obtain related texture information. Based on the analysis of the texture information, motion information such as the rotation direction and the rotation angle of the dial plate 120 may be determined.

In some embodiments, compared with the protrusion, when a texture is a groove, a thickness of the dial plate 120 may be further reduced, so as to implement lightening and thinning of the camera decoration component 100. In this regard, the identification texture 122 being a groove is used as an example for description. The identification texture 122 being the groove may include a first surface 122a, a second surface 122b, and a third surface 122c, and the second surface 122b is connected between the first surface 122a and the third surface 122c. There is an inclination angle θ between the first surface 122a and the second surface 122b, and there is an inclination angle φ between the third surface 122c and the second surface 122b. The inclination angle θ and the inclination angle φ are different in magnitude. For example, the inclination angle θ may be an obtuse angle, and the inclination angle φ may be a right angle.

It should be understood that, based on a difference between the inclination angle θ and the inclination angle φ, during the rotation of the dial plate 120, texture information such as depth or roughness of the groove obtained by the texture sensor 134 is also different. For example, the dial plate 120 rotates in a clockwise direction, the texture sensor 134 sequentially scans the first surface 122a, the second surface 122b, and the third surface 122c, and the processor may obtain first texture information through analysis; and the dial plate 120 rotates in a counterclockwise direction, the texture sensor 134 sequentially scans the third surface 122c, the second surface 122b, and the first surface 122a, and the processor may obtain second texture information through analysis. The first texture information and the second texture information are not the same based on differences in aspects such as the inclination angle θ and the inclination angle φ, scan time, and the like.

Based on this, according to the texture information of the groove and intervals between the grooves, the rotation direction, the rotation angle, and the like of the dial plate 120 that is dialed may be determined, so as to facilitate execution of a related program.

In some other embodiments, the first surface 122a may be a curved surface, and the third surface 122c may be a flat surface; or the first surface 122a may be a flat surface, and the third surface 122c may be a curved surface.

In some other embodiments, the groove may include a first surface 122a and a second surface 122b, and there is an inclination angle between the first surface 122a and the second surface 122b; or the first surface 122a is a curved surface, and the second surface 122b is a flat surface; or the first surface 122a is a flat surface, and the second surface 122b is a curved surface; or the first surface 122a and the second surface 122b are curved surfaces with different curvatures. Based on this, the corresponding texture information may also be obtained according to depth changes of the first surface 122a and the second surface 122b, and the motion information such as the rotation direction and the rotation angle of the dial plate 120 may also be determined according to the depth changes.

It should be understood that the protrusion may be understood by analogy with the groove, for example, the protrusion may include a first surface, a second surface, and a third surface, and a convex top surface is connected between the first surface and the third surface, which is not repeated herein.

In some other embodiments, the identification texture 122 may further include a plurality of groups of identification stripes with a gradual change in lengths, and the plurality of groups of identification stripes are disposed along the circumferential direction of the dial plate 120, where the length refers to a size of the identification stripe in a radial direction of the dial plate 120, and the gradual change may include gradual increase or gradual decrease In some embodiments, the quantity of texture sensors 134 may be one, two, or more, which is not limited. A type of the texture sensor 134 may include a depth sensor, a laser sensor, or the like. The identification texture 122 may be formed on the dial plate 120 by a process such as CNC or laser engraving.

In some embodiments, the embodiments of this application further provide a camera module, and the camera module may include a camera and the camera decoration component 100 described in the foregoing embodiments. A through hole of the decoration member 110 may directly face a lens of the camera, so that an image sensor of the camera may obtain external light or reflected light.

Figure 11:
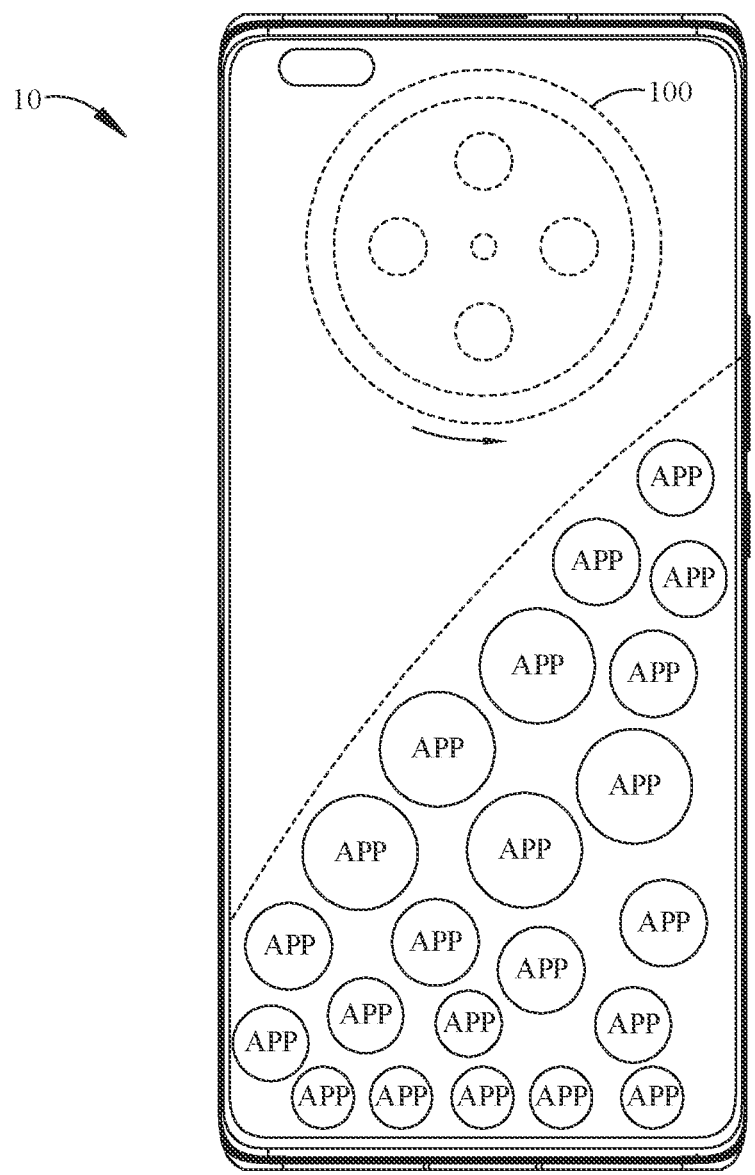
FIG. 11 is an application scenario diagram of an electronic device in which a one-handed operation mode is entered in response to an operation on a dial plate performed by a user according to an embodiment of this application.

Referring to FIG. 11, in some embodiments, when the camera decoration component 100 is applied to an electronic device 10, the electronic device 10 may quickly enter a one-handed operation mode by dialing the dial plate 120 in one direction. Commonly used applications may be placed close to a corner of a screen to help the user perform the one-handed operation. When the one-handed operation mode needs to be exited, the dial plate 120 may be dialed in an opposite direction to switch the electronic device 10 from the one-handed mode to a normal mode. As a result, quick switching between the normal mode and the one-handed mode may be implemented to meet the user's use requirement.

For example, when the user holds the electronic device 10 with a right hand, the user may dial the dial plate 120 with an index finger of the right hand, generally dial the dial plate 120 in a counterclockwise direction. In this regard, defined by software, when it is detected that the dial plate 120 is dialed counterclockwise, the electronic device 10 may enter the one-handed operation mode, and commonly used applications are located in a region in a lower right corner of the screen, so that the user's right thumb may easily touch. In addition, when the user holds the electronic device 10 with a left hand, the dial plate 120 is generally dialed clockwise, which may be understood by analogy with the foregoing example, and is not repeated herein.

In some embodiments, when the camera decoration component 100 is applied to the electronic device 10, and when performing an operation such as video recording or photographing, the user may zoom a video or an image or rapidly switch between modes such as a video recording mode and a photographing mode by dialing the dial plate 120. It should be understood that, based on a preset angle of the dial plate 120, the user may relatively accurately zoom the video or image, or rapidly switch between the video recording mode and the photographing mode, so as to improve the user experience.

Figure 12:
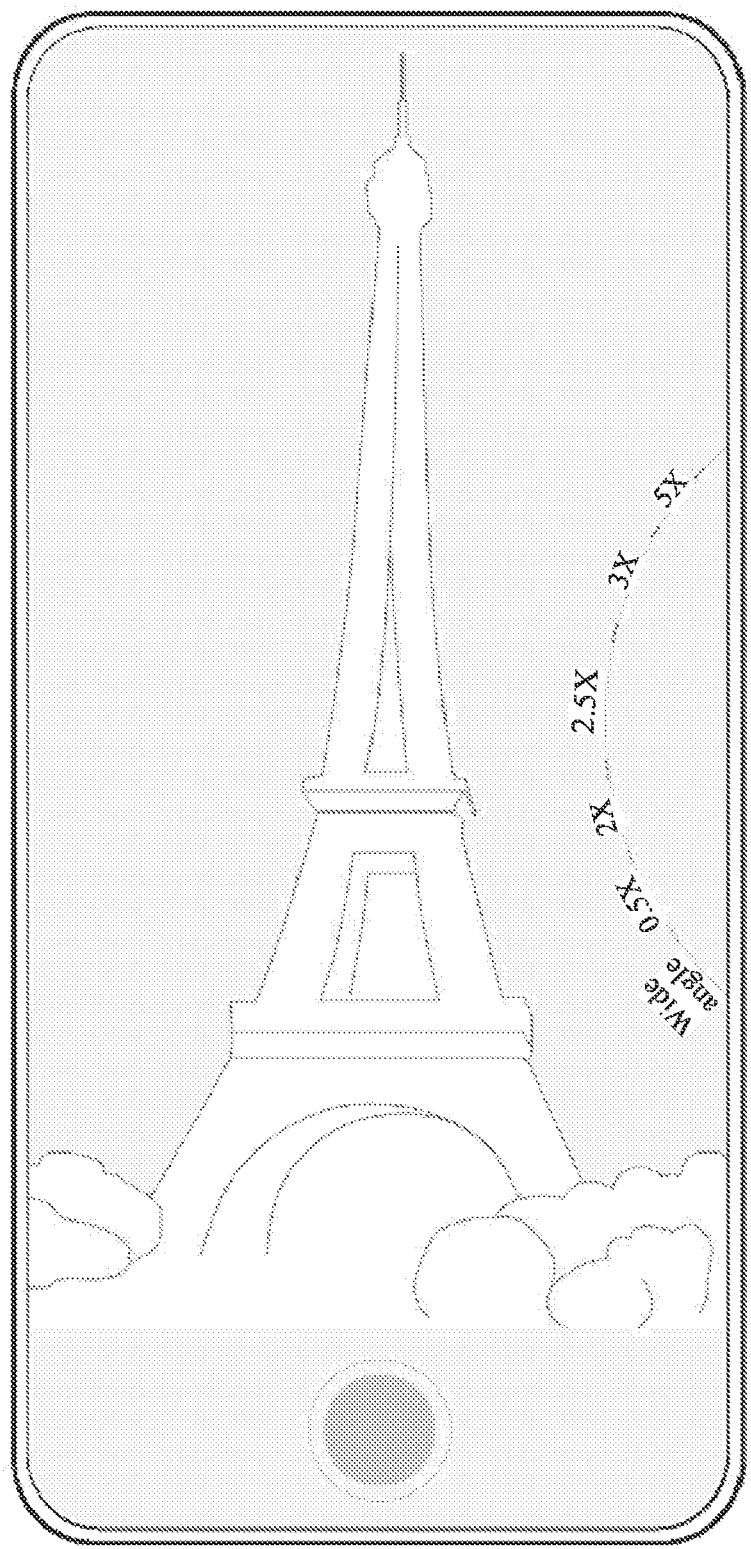
FIG. 12 is an application scenario diagram of an electronic device in which a focal length is changed in response to an operation on a dial plate performed by a user according to an embodiment of this application.

Referring to FIG. 12, when the user vertically holds the electronic device 10 to perform photographing, by dialing the dial plate 120, an image may be zoomed in or out, that is, an imaging focal length of the camera module may be changed. For example, when the dial plate 120 is dialed in a clockwise direction, the focal length is reduced; and when the dial plate 120 is dialed in a counterclockwise direction, the focal length is increased.

Figure 13:
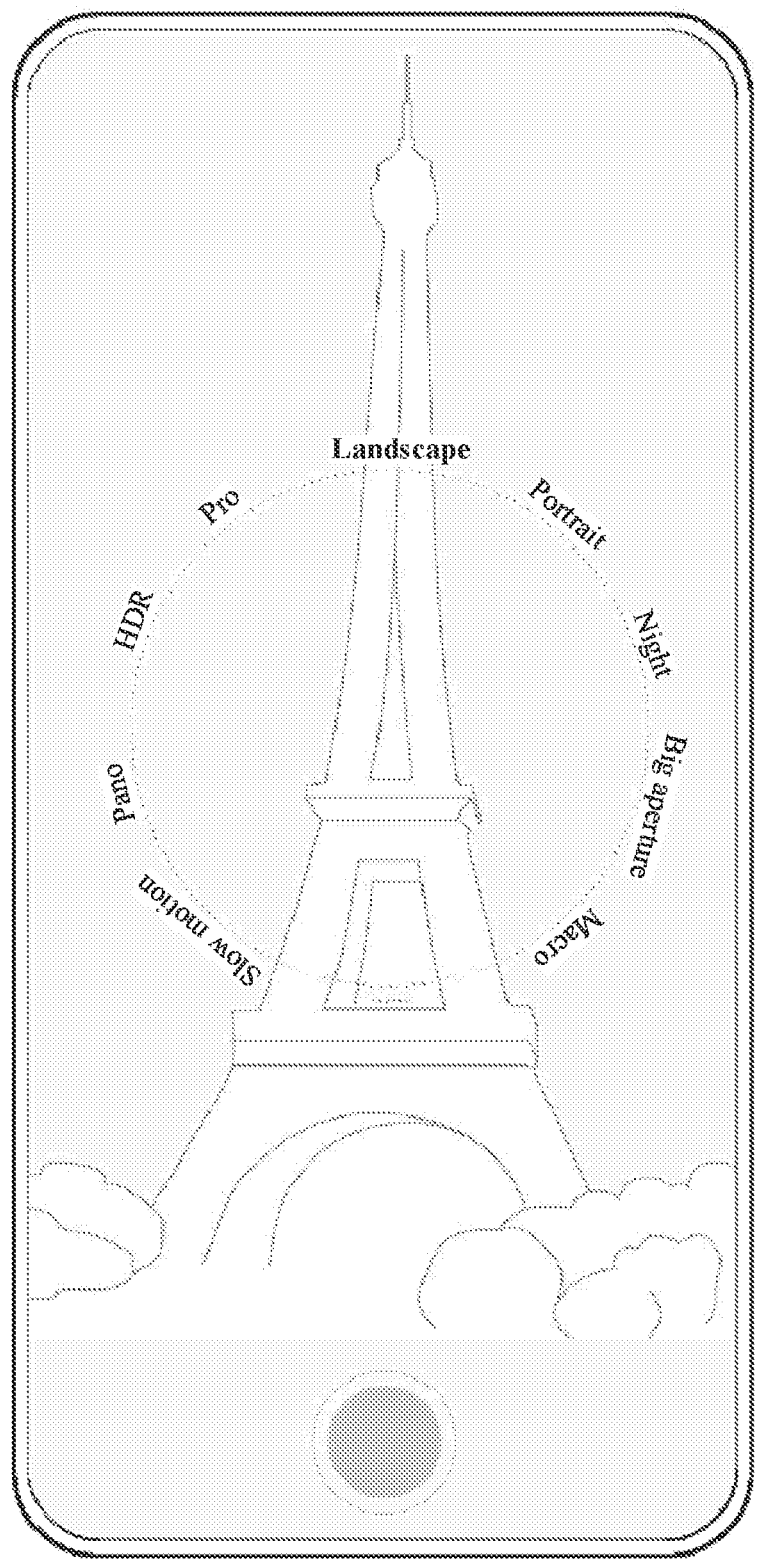
FIG. 13 is an application scenario diagram of an electronic device in which a photographing mode is changed in response to an operation on a dial plate performed by a user according to an embodiment of this application.

Referring to FIG. 13, when the user vertically holds the electronic device 10 to perform photographing, by dialing the dial plate 120, all modes may be switched. For example, when the dial plate 120 is dialed in a clockwise direction, a "landscape" mode may be switched to a "professional" mode, and when the dial plate 120 is dialed in a counterclockwise direction, the "landscape" mode may be switched to a "portrait" mode. In addition, according to the user's use requirement, switching between a "photographing" mode and a "video recording" mode may also be implemented.

Figure 14:
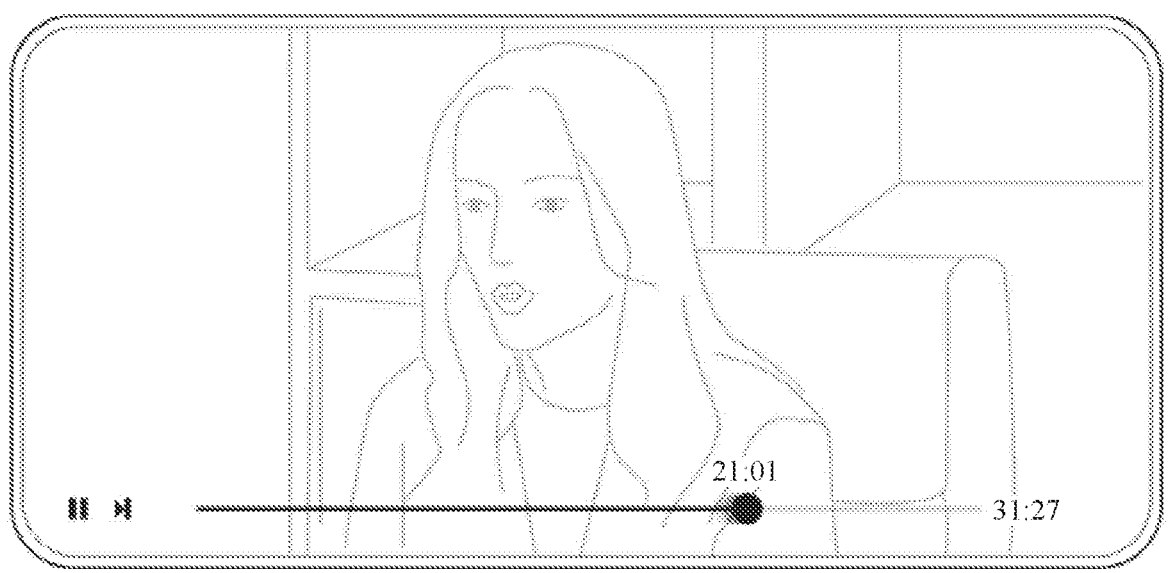
FIG. 14 is an application scenario diagram of an electronic device in which a video progress is adjusted in response to an operation on a dial plate performed by a user according to an embodiment of this application.

Referring to FIG. 14, in some embodiments, when the camera decoration component 100 is applied to the electronic device 10, and when the user watches a video in a landscape orientation, by dialing the dial plate 120, functions such as fast forwarding and fast rewinding may be implemented. It should be understood that, based on the rotation direction and the rotation angle of the dial plate 120, extents of fast forwarding and fast rewinding may be precisely controlled to meet the watching requirements of the user.

Figure 15:
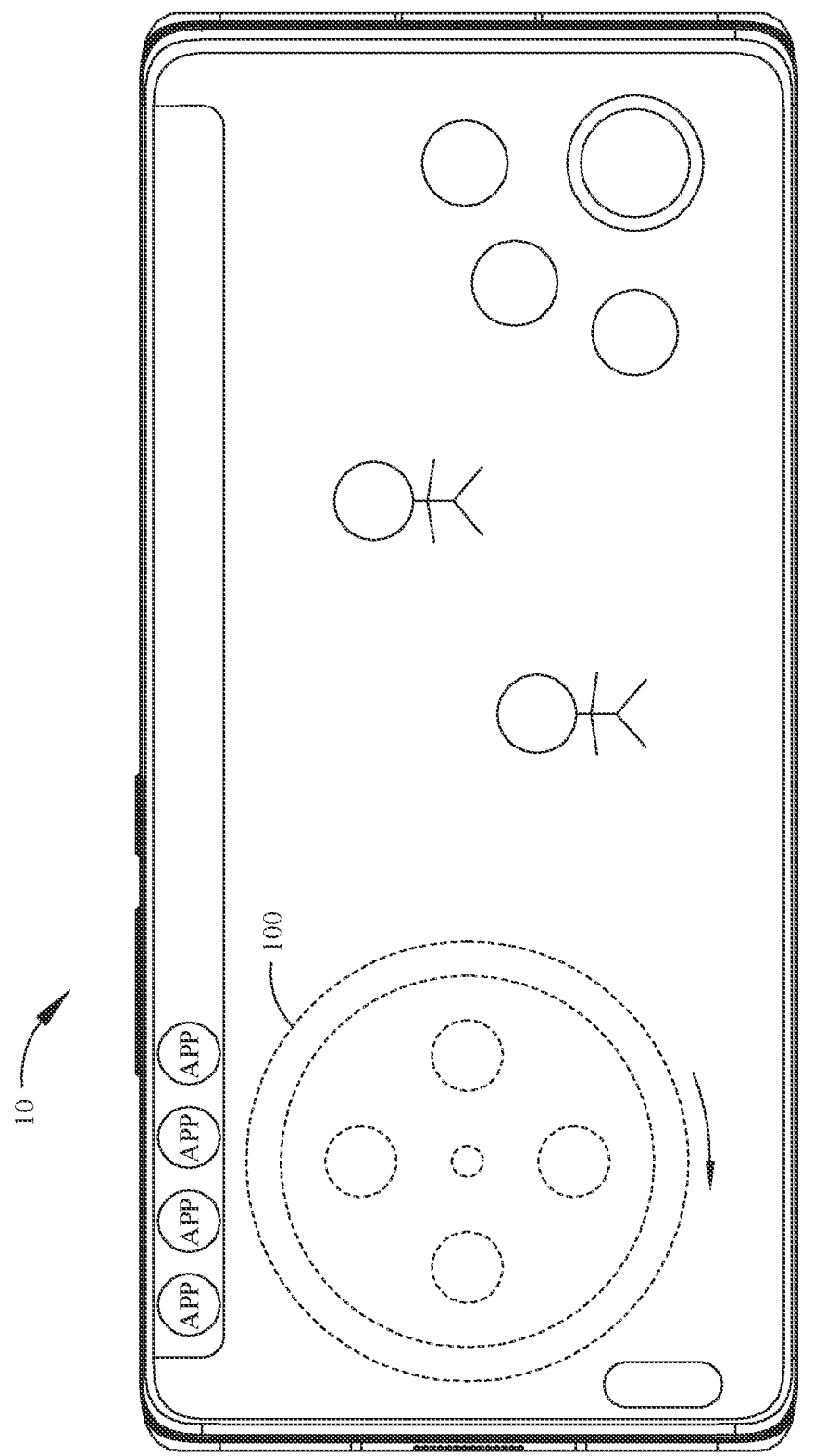
FIG. 15 is an application scenario diagram of an electronic device in which an application is switched in response to an operation on a dial plate performed by a user according to an embodiment of this application.

Referring to FIG. 15, in some embodiments, when the camera decoration component 100 is applied to the electronic device 10, and the user operates a virtual object through virtual touch buttons on the screen, some customized functions may be correspondingly expanded based on the dial plate 120. For example, by dialing the dial plate 120, it is possible to zoom in or out, switch a perspective, switch an application (APP), view a pop-up message, or the like.

In some embodiments, when the camera decoration component 100 is applied to the electronic device 10, the user may further implement functions such as controlling volume increase and decrease, flipping a video or a picture, zooming in and out an image or a text, and switching applications in special scenarios.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention Therefore, the protection scope of the present invention shall be subject to the protection scope of the claims.

What is claimed is:

1. An electronic device, comprising:
   a rear cover; and
   a camera decoration component connected to the rear cover, the camera decoration component comprising:
   a decoration member configured to protect a camera of the electronic device, wherein the decoration member has a virtual rotation axis that is perpendicular to the rear cover;
   a dial plate being annular and sleeved on an outer peripheral side of the decoration member, wherein the dial plate is rotatably connected to the decoration member, and wherein the dial plate is configured to rotate around the virtual rotation axis of the decoration member;
   a plurality of positioning members, wherein the plurality of positioning members are fixed to the decoration member and are disposed toward the dial plate, and wherein the plurality of positioning members are disposed at equal intervals along a circumferential direction of the virtual rotation axis; and
   a plurality of induction members, wherein the plurality of induction members are fixed to the dial plate and are disposed toward the decoration member, and wherein the plurality of induction members are disposed at equal intervals along the circumferential direction of the virtual rotation axis,
   wherein the virtual rotation axis is a center of a circle, wherein an angle between two adjacent positioning members is α,
wherein an angle between two adjacent induction members is β,
wherein the angle α is an integer multiple of the angle β, and
wherein when directly facing each other, the positioning members and the induction members are configured to control the dial plate to be in a hovering state.

2. The electronic device of claim 1, wherein the electronic device further comprises a sensor directly facing the dial plate, wherein the sensor is configured to obtain motion information of the dial plate during rotation.

3. The electronic device of claim 2, wherein the decoration member comprises a main body portion and an annular bearing portion, wherein the annular bearing portion is located on an outer side of the main body portion and is disposed around the main body portion, and wherein the plurality of positioning members are disposed at equal intervals along a circumferential direction of the bearing portion.

4. The electronic device of claim 3, wherein the bearing portion comprises a plurality of first mounting grooves disposed at equal intervals, wherein each of the positioning members is correspondingly mounted in each of the first mounting grooves, wherein the dial plate is disposed on the bearing portion and is rotatably connected to the main body portion, wherein the dial plate comprises a plurality of second mounting grooves disposed at equal intervals, and wherein each of the induction members is correspondingly mounted in each of the second mounting grooves.

5. The electronic device of claim 4, wherein the positioning member is made of magnetic metal, wherein the induction member is made of magnetic iron, wherein the sensor is a Hall sensor, wherein the Hall sensor directly faces the induction member when the dial plate is in the hovering state, and wherein the Hall sensor is configured to obtain magnetic field change information of the induction member that moves synchronously during movement of the dial plate.

6. The electronic device of claim 5, wherein a relationship between the angle α and the angle β is α=β*N, wherein N is a positive integer greater than or equal to 3, wherein a quantity of the Hall sensors is N, wherein the plurality of positioning members and the N Hall sensors are circumferentially disposed around the bearing portion as a whole, wherein the virtual rotation axis is used as the center of the circle, wherein both an angle between two adjacent Hall sensors and an angle between a Hall sensor and an adjacent positioning member are λ, and wherein λ=β.

7. The electronic device of claim 4, wherein the dial plate comprises a top surface and a bottom surface opposite to each other, wherein the bottom surface faces the bearing portion, wherein a side of the dial plate facing the bottom surface is provided with an identification texture, and wherein the sensor is a texture sensor that is configured to obtain texture information of the identification texture that moves synchronously during movement of the dial plate.

8. The electronic device of claim 4, wherein the positioning member comprises an elastic member and a ball, wherein the elastic member and the ball are sequentially disposed in one of the first mounting grooves, wherein the elastic member is pressed between the bearing portion and the ball, wherein the dial plate is controlled to be in the hovering state when the ball is engaged with one of the second mounting grooves.

9. The electronic device of claim 3, wherein the main body portion comprises a boss in an axial direction along the virtual rotation axis, and wherein the boss protrudes relative to the dial plate.

10. The electronic device of claim 3, wherein the positioning member is made of magnetic metal, wherein the induction member is made of magnetic iron, wherein the sensor is a Hall sensor, wherein the Hall sensor faces the induction member when the dial plate is in the hovering state, and wherein the Hall sensor is configured to obtain magnetic field change information of the induction member that moves synchronously during movement of the dial plate.

11. The electronic device of claim 3, wherein the dial plate comprises a top surface and a bottom surface opposite to each other, wherein the bottom surface faces the bearing portion, wherein a side of the dial plate facing the bottom surface is provided with an identification texture, wherein the sensor is a texture sensor, and wherein the texture sensor is configured to obtain texture information of the identification texture that moves synchronously during movement of the dial plate.

12. The electronic device of claim 11, wherein the identification texture comprises a plurality of grooves or a plurality of protrusions, and wherein the plurality of grooves or the plurality of protrusions are disposed at equal intervals along the circumferential direction of the virtual rotation axis.

13. The electronic device of claim 12, wherein each of the grooves or each of the protrusions comprises a first surface, a second surface, and a third surface;
wherein the first surface, the second surface, and the third surface are sequentially connected;
wherein an inclination angle between the first surface and the second surface is θ, and an inclination angle between the second surface and the third surface is φ; and
wherein the inclination angle θ and the inclination angle φ are different in magnitude.

14. The electronic device of claim 3, wherein the camera decoration component further comprises a sliding member, wherein the sliding member is sandwiched between the dial plate and the bearing portion, and wherein the sliding member is spaced apart from the positioning member.

15. The electronic device of claim 1, wherein a relationship between the angle α and the angle β is α=β*N, wherein N is a positive integer greater than or equal to 3.

16. The electronic device of claim 1, wherein the decoration member comprises a first groove disposed along the circumferential direction of the virtual rotation axis, wherein the dial plate comprises a second groove disposed along the circumferential direction of the virtual rotation axis, wherein the second groove directly faces the first groove, wherein the camera decoration component further comprises a gasket, wherein the gasket is sandwiched between the first groove and the second groove, and wherein the gasket is configured to implement a rotatable connection between the dial plate and the decoration member.

17. The electronic device of claim 16, wherein the gasket comprises an annular portion, a first buckling portion, and a second buckling portion;
wherein the first buckling portion is located on an inner side of the annular portion;
wherein the second buckling portion is located on an outer side of the annular portion and is disposed alternately with the first buckling portion; and wherein the first buckling portion is at least partially disposed in the first groove, and the second buckling portion is at least partially disposed in the second groove.

18. The electronic device of claim 1, wherein the induction member is made of magnetic iron, and wherein the positioning member is made of magnetic metal or magnetic iron.

19. The electronic device of claim 1, wherein the induction member is made of magnetic metal, and wherein the positioning member is made of magnetic iron.

20. An electronic device, comprising:
a rear cover; and
a camera decoration component, the camera decoration component comprising:
  a decoration member configured to protect a camera of the electronic device, wherein the decoration member has a virtual rotation axis that is perpendicular to the rear cover;
  a dial plate sleeved on an outer peripheral side of the decoration member, wherein the dial plate is rotatably connected to the decoration member, and the dial plate is configured to rotate around the virtual rotation axis;
  a plurality of positioning members, wherein the plurality of positioning members are fixed to the decoration member and are disposed toward the dial plate, and wherein the plurality of positioning members are disposed at equal intervals along a circumferential direction of the virtual rotation axis; and
  a plurality of induction members, wherein the plurality of induction members are fixed to the dial plate and are disposed toward the decoration member, and wherein the plurality of induction members are disposed at equal intervals along the circumferential direction of the virtual rotation axis;
wherein the virtual rotation axis is a center of a circle,
wherein an angle between two adjacent positioning members is $\alpha$,
wherein an angle between two adjacent induction members is $\beta$,
wherein a relationship between the angle $\alpha$ and the angle $\beta$ is $\alpha=\beta*N$,
wherein N is a positive integer, and
wherein during directly facing each other, the positioning member and the induction member are configured to control the dial plate to be in a hovering state.

* * * * *